US009183043B2

(12) United States Patent
Dice et al.

(10) Patent No.: US 9,183,043 B2
(45) Date of Patent: Nov. 10, 2015

(54) SYSTEMS AND METHODS FOR ADAPTIVE INTEGRATION OF HARDWARE AND SOFTWARE LOCK ELISION TECHNIQUES

(71) Applicant: Oracle International Corporation, Redwood City, CA (US)

(72) Inventors: David Dice, Foxboro, MA (US); Alex Kogan, Needham, MA (US); Yosef Lev, New York, NY (US); Timothy M. Merrifield, Chicago, IL (US); Mark S. Moir, Wellington (NZ)

(73) Assignee: Oracle International Corporation, Redwood City, CA (US)

( * ) Notice: Subject to any disclaimer, the term of this patent is extended or adjusted under 35 U.S.C. 154(b) by 16 days.

(21) Appl. No.: 14/254,758

(22) Filed: Apr. 16, 2014

(65) Prior Publication Data

US 2015/0026688 A1 Jan. 22, 2015

Related U.S. Application Data

(60) Provisional application No. 61/846,994, filed on Jul. 16, 2013.

(51) Int. Cl.
*G06F 9/46* (2006.01)
*G06F 9/48* (2006.01)
*G06F 9/50* (2006.01)
*G06F 9/52* (2006.01)

(52) U.S. Cl.
CPC .............. *G06F 9/467* (2013.01); *G06F 9/4881* (2013.01); *G06F 9/5022* (2013.01); *G06F 9/528* (2013.01)

(58) Field of Classification Search
CPC ..... G06F 9/467; G06F 9/4881; G06F 9/5022; G06F 9/528
See application file for complete search history.

(56) References Cited

U.S. PATENT DOCUMENTS 6,697,834 B1 * 2/2004 Dice .............................. 718/102
6,799,236 B1 * 9/2004 Dice et al. ..................... 710/200

(Continued)

OTHER PUBLICATIONS

Zuberi et al. "An Efficient Semaphore Implementation Scheme for Small-Memory Embedded Systems", 1997 IEEE, pp. 25-34.*

(Continued)

*Primary Examiner* — Van Nguyen
(74) *Attorney, Agent, or Firm* — Robert C. Kowert; Meyertons, Hood, Kivlin, Kowert & Goetzel, P.C.

(57) ABSTRACT

Particular techniques for improving the scalability of concurrent programs (e.g., lock-based applications) may be effective in some environments and for some workloads, but not others. The systems described herein may automatically choose appropriate ones of these techniques to apply when executing lock-based applications at runtime, based on observations of the application in the current environment and with the current workload. In one example, two techniques for improving lock scalability (e.g., transactional lock elision using hardware transactional memory, and optimistic software techniques) may be integrated together. A lightweight runtime library built for this purpose may adapt its approach to managing concurrency by dynamically selecting one or more of these techniques (at different times) during execution of a given application. In this Adaptive Lock Elision approach, the techniques may be selected (based on pluggable policies) at runtime to achieve good performance on different platforms and for different workloads.

20 Claims, 13 Drawing Sheets

(56) References Cited

U.S. PATENT DOCUMENTS

| | | | | |
|---|---|---|---|---|
| 7,000,047 | B2* | 2/2006 | Nguyen et al. | 710/200 |
| 7,089,374 | B2* | 8/2006 | Tremblay et al. | 711/145 |
| 7,120,762 | B2* | 10/2006 | Rajwar et al. | 711/150 |
| 7,206,903 | B1* | 4/2007 | Moir et al. | 711/145 |
| 7,389,383 | B2* | 6/2008 | Tremblay et al. | 711/118 |
| 7,516,366 | B2* | 4/2009 | Lev et al. | 714/38.13 |
| 7,613,908 | B2* | 11/2009 | Raikin et al. | 712/220 |
| 7,856,537 | B2* | 12/2010 | Kumar et al. | 711/152 |
| 8,041,926 | B2* | 10/2011 | Tene et al. | 712/220 |
| 8,190,859 | B2* | 5/2012 | Akkary et al. | 712/216 |
| 8,402,464 | B2* | 3/2013 | Dice et al. | 718/102 |
| 8,627,030 | B2* | 1/2014 | Akkary et al. | 711/163 |
| 8,826,249 | B2* | 9/2014 | Dice et al. | 717/148 |
| 8,914,620 | B2* | 12/2014 | Dice | 712/225 |
| 8,966,491 | B2* | 2/2015 | Calciu et al. | 718/102 |
| 2009/0119459 | A1 | 5/2009 | Akkary et al. | |
| 2013/0097607 | A1 | 4/2013 | Lewis et al. | |
| 2013/0205119 | A1 | 8/2013 | Rajwar et al. | |
| 2014/0059333 | A1 | 2/2014 | Dixon et al. | |

OTHER PUBLICATIONS

Li et al. "Introduce Satisfy policies into Semaphore in WRK", 2009 IEEE, 5 pages.*

Shailender Chaudhry, Robert Cypher, Magnus Ekman, Martin Karlsson, Anders Landin, Sherman Yip, Håkan Zeffer, and Marc Tremblay. Rock: A High-Performance Sparc CMT Processor, IEEE Micro, v.29 n. 2, p. 6-16, Mar. 2009.

Corbet. Driver porting: mutual exclusion with seqlocks, Feb. 2003, Downloaded from lwn.net/Articles/22818/ on Apr. 16, 2014, pp. 1-2.

Dave Dice, Maurice Herlihy, Doug Lea, Yossi Lev, Victor Luchangco, Wayne Mesard, Mark Moir, Kevin Moore, and Dan Nussbaum, "Applications of the Adaptive Transactional Memory Test Platform", In the third annual ACM SIGPLAN Workshop on Transactional Computing, Feb. 2008, pp. 1-10.

Dave Dice, Yossi Lev, Mark Moir, and Dan Nussbaum, "Early experience with a commercial hardware transactional memory implementation" Technical Report TR-2009-180, Sun Microsystems Laboratories, Mar. 7-11, 2009, pp. 1-12.

Dave Dice, Yossi Lev, Mark Moir, and Daniel Nussbaum, "Early experience with a commercial hardware transactional memory implementation", In Proceedings of the 14th international conference on Architectural support for programming languages and operating systems, ASPLOS XIV, pp. 157-168, New York, NY, USA, Oct. 2009. ACM.

Maurice Herlihy and J. Eliot B. Moss, "Transactional memory: Architectural support for lock-free data structures", In Proc. 20th Annual International Symposium on Computer Architecture, pp. 289-300, May 1993, pp. 1-12.

Christoph Lameter, "Effective Synchronization on Linux/NUMA Systems", In Gelato Conference, Palo Alto, California. Gelato Foundation, May 2005. Retrieved from www.lameter.com/gelato2005.pdf on Apr. 16, 2014, pp. 1-23.

Ravi Rajwar and James R. Goodman, "Speculative lock elision: Enabling highly concurrent multithreaded execution", In Proc. 34th International Symposium on Microarchitecture, pp. 294-305, Dec. 2001.

* cited by examiner

SYSTEMS AND METHODS FOR ADAPTIVE INTEGRATION OF HARDWARE AND SOFTWARE LOCK ELISION TECHNIQUES

This application claims benefit of priority of U.S. Provisional Application Ser. No. 61/846,994 entitled "System and Method for Adaptive Lock Elision," filed Jul. 16, 2013, the content of which is incorporated by reference herein in its entirety.

BACKGROUND

1. Field of the Disclosure

This disclosure relates generally to synchronization mechanisms for use in concurrent programming, and more particularly to systems and methods for implementing adaptive lock elision.

2. Description of the Related Art

Over the past decade, the focus of the computing industry has shifted from making faster computing cores to building systems with more cores per processor chip and more processor chips per system. To continue to benefit from advances in technology, therefore, applications must be able to exploit increasing numbers of cores concurrently. Constructing scalable applications that can do so is increasingly challenging as the number of cores grows, and this is exacerbated by other issues, such as the increasing latency gap between "local" and "remote" resources such as caches and memory.

In response to these growing challenges, researchers have sought techniques to support effective development of scalable concurrent programs, including techniques for improving lock scalability. While a number of such techniques have proved useful in some contexts, they are typically well-suited to particular use cases and workloads, but are ineffective in improving scalability (or even harm scalability) for other use cases. Furthermore, some techniques (e.g., transactional lock elision) depend on specific hardware support that is not available on all target platforms, while others use software techniques that may be difficult or impossible to apply to some problems.

Exacerbating the problem further, software is often required to target a variety of hardware platforms, system sizes and system configurations. Developers who hope to select and tune the best strategies and mechanisms for each context often find that these choices depend on the workload, which can change over time even for a given application on a given platform. It is difficult and expensive to build and maintain variants that are optimized for a variety of environments and workloads. Therefore, developers are often forced to optimize for a small number of "most important" configurations, at the cost of significantly degraded performance in other contexts.

Transactional Memory (TM) is a promising concurrency control technology that aids programmers writing parallel programs to perform correct data sharing between concurrent computations (which commonly manifest as "threads"). Transactional memory is widely considered to be the most promising avenue for addressing issues encountered in concurrent programming and execution. Using transactional memory, programmers may specify what should be done atomically, rather than how this atomicity should be achieved. The transactional memory implementation may then be responsible for guaranteeing the atomicity, largely relieving programmers of the complexity, tradeoffs, and software engineering problems typically associated with concurrent programming and execution. In general, transactional memory may be implemented in hardware, with the hardware transactional memory (HTM) directly ensuring that a transaction is atomic, or as software transactional memory (STM) that provides the "illusion" that a transaction is atomic, even though in fact it is executed in smaller atomic steps by underlying hardware. HTM solutions are generally faster than STM ones, but so-called "best-effort" HTM implementations may not be guaranteed to be able to commit any particular transaction. Recently developed Hybrid Transactional Memory (HyTM) implementations may allow transactions to be executed using hardware transactional memory if it is available (and when it is effective), or using software transactional memory otherwise.

SUMMARY

The systems and method described herein may, in various embodiments, be used to implement adaptive integration of hardware and software lock elision techniques for use in executing critical sections of a concurrent (e.g., multi-threaded) application. Particular techniques for improving the scalability of concurrent programs (e.g., lock-based applications) may be effective in some environments and for some workloads, but not others. In various embodiments, the systems described herein may support multiple integrated techniques for improving the scalability and/or performance of these applications. For example, these systems may be configured to automatically choose (at runtime) an appropriate lock elision technique or an appropriate combination of lock elision techniques to be applied when executing critical sections of code within lock-based applications.

In some embodiments, an adaptive lock elision (ALE) library may support these techniques, and programmers may be able to instrument the code of legacy lock-based applications in order to take advantage of these techniques. Methods within the ALE library may be called to manage concurrency (in the face of multiple concurrent attempts to execute critical sections), coordinate between integrated lock elision mechanisms, and/or collect statistics and profiling information (e.g., detailed, fine-grained performance data) for executions of the critical sections using different ones of the lock elision mechanisms. For example, ALE macros may be configured to collect and/or report one or more of: information characterizing the workload of the application, information indicating the number of times that execution of each critical section of code in the application was attempted, information indicating the number or percentage of times that a critical section of code in the application was successfully executed using each of the plurality of integrated mechanisms, information indicating the number or percentage of times that execution of a critical section of code in the application was attempted using each of multiple integrated mechanisms, or information indicating an amount of time spent in attempting to execute a critical section of code in the application using each of the plurality of integrated mechanisms. This information may be collected and/or reported on a per-lock basis, on a per-critical-section basis, on a per-context basis, or for each lock-context pair, in different embodiments.

In some embodiments, programmers may be able to designate (e.g., through an API of the ALE library) additional contexts or scopes for a critical section for which statistics and profiling information may be collected and/or for which execution mode decision may be made. Programmers may also be able to guide execution mode choices by defining or specifying different contexts for conditional execution paths within the code of the application and/or defining them based on the values of variables or parameters that cause various execution paths to be taken at runtime.

In some embodiments, when a critical section of code is encountered, the context in which the critical section is executing may be determined, and an appropriate policy for that context may be used to select one or more execution modes in which to attempt to execute the critical section in that context. The policy may be selected from among multiple static and/or dynamic (adaptive) policies, some of which may take the collected statistic and profiling information into account when determining the best execution mode(s) for executing the critical section. When making these decisions, the policy may also take into account a current or historical workload for the critical section, the platform on which it is executing, whether hardware transactional memory is available, whether an alternate software-based optimistic execution path is available, or the status, the execution mode, or the likelihood of conflict with concurrent executions of the critical section, of another critical section associated with the same lock, or of other code of the application.

In some embodiments, the lock elision techniques that are integrated together in the system may include two different types of techniques for improving lock scalability (e.g., transactional lock elision using hardware transactional memory, and one or more optimistic software techniques). The ALE library may adapt its approach to managing concurrency in the system by dynamically selecting one or more of these techniques (at different times) during execution of a given application. For example, in some embodiments, a determination may be made that transactional lock elision (using hardware transactional memory) should be attempted one or more times prior to attempting to execute a critical section using an optimistic alternative path (when both are available). In some embodiments, multiple executions of critical sections may be grouped together and attempted in parallel (e.g., if they are executed using the same lock elision technique and/or cannot conflict with each other) prior to attempting to execute one or more other critical sections that may potentially conflict with those executions or that are to be executed using a different lock elision technique. If none of the attempts to execute a critical section using a lock elision technique are successful (e.g., after a pre-determined maximum number of attempts to execute the critical section using each selected technique), the lock associated with the critical section may be acquired and the critical section may be executed while the lock is held.

Figure 1:
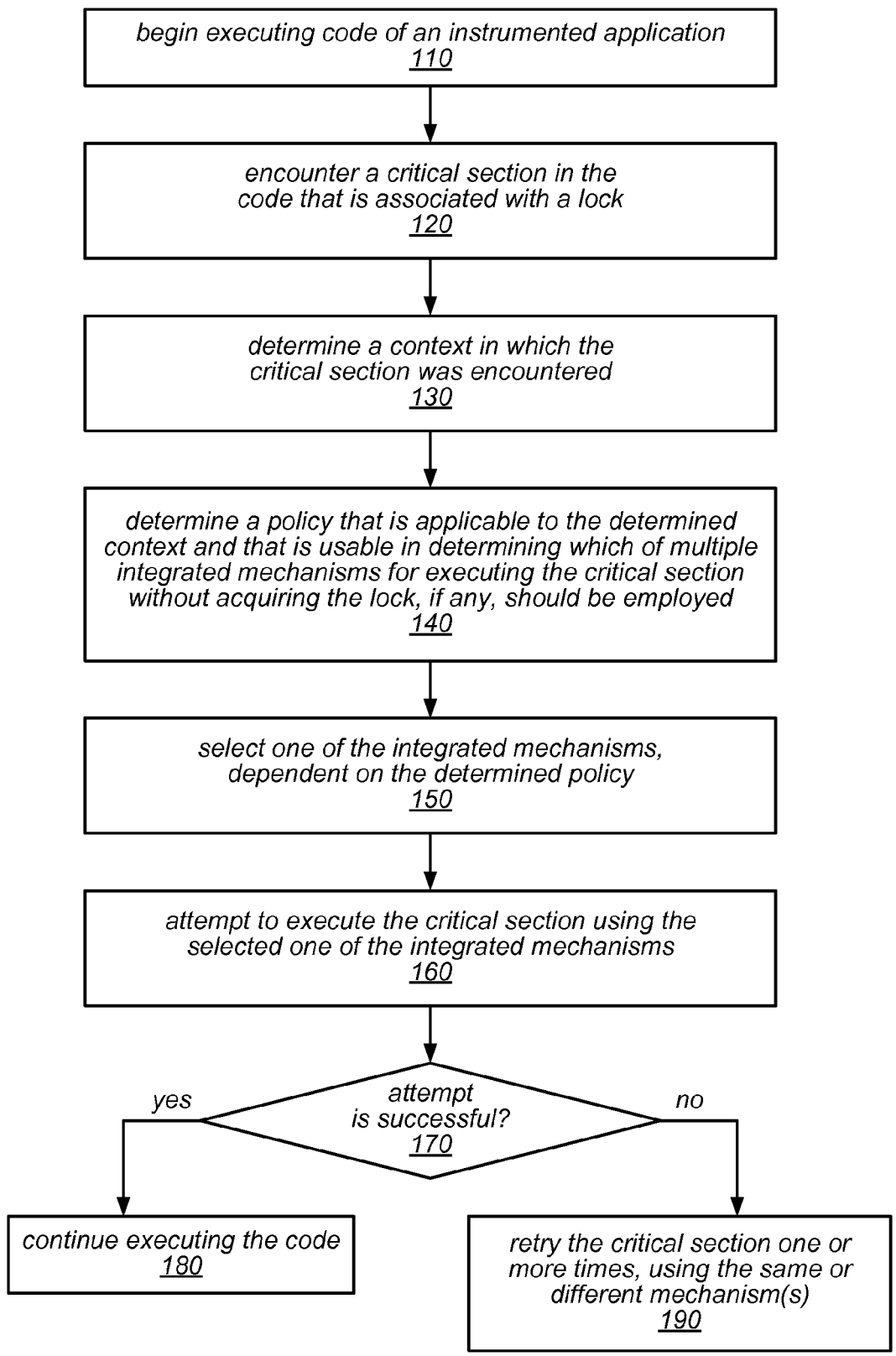
FIG. 1 is a flow diagram illustrating one embodiment of a method for implementing adaptive lock elision, as described herein.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Transactional Lock Elision (TLE) and optimistic software execution are two types of techniques for improving the scalability of lock-based programs. The former uses hardware transactional memory (HTM) to improve scalability without requiring code changes, while the latter may involve modest code changes but may not require special hardware support. The most effective technique(s) to use to support the development of scalable concurrent programs in a particular situation may depend on any of numerous factors, including, but not limited to: critical section code, calling context, workload characteristics, hardware platform and/or available hardware support for synchronization.

For example, the best lock elision mechanism to use in a particular context often depends on the workload, which may change over time even for a given application on a given platform. Therefore, developers generally cannot determine in advance which mechanism is best for a particular situation. Different synchronization mechanisms may be most effective in different environments and for different workloads, and it is usually impractical to construct different versions of an application for each case. Some techniques that are well-suited to some use cases are ineffective (or sometimes even detrimental) for scalability for others. For example, some techniques depend on hardware support that is not available on all systems, and others may use software techniques that are difficult or impossible to apply in certain cases. Selecting techniques (or combinations of techniques) and tuning them specifically for use in a particular context is often impractical because, as previously noted, these choices may depend on numerous factors (including the workload), which may change over time.

In some embodiments, the systems and methods described herein may be used to choose appropriate lock elision mechanisms to use at runtime, based on observations of the application in the current environment and workload. In some embodiments, these systems and methods may take advantage of an Adaptive Lock Elision (ALE) library that provides pragmatic support for improving the scalability of legacy lock-based concurrent (e.g., multithreaded) applications. In various embodiments, lock elision techniques may improve scalability without using finer-grained locking or non-blocking synchronization, both of which may significantly complicate applications and may harm performance for some platforms and workloads. For example, Transactional Lock Elision (TLE) may allow critical sections of code in a concurrent (e.g., multithreaded) application that are protected by the same lock to execute concurrently, exploiting hardware transactional memory (HTM) to detect conflicts between them. In another example, optimistic software techniques may use software mechanisms, e.g., seqlocks or other software mechanisms, to similarly support concurrent execution of critical sections that are protected by the same lock without acquiring the lock. In both techniques, critical sections may experience interference and need to be retried (perhaps in a different mode). With software optimistic execution, software may need to manage conflict detection and ensure safe execution when conflicts occur. However, in some embodiments, this may be much easier than using finer-grained locking schemes or non-blocking synchronization; indeed, some such techniques can be achieved via compiler support.

In various embodiments, the systems described herein may integrate multiple techniques for executing critical sections, which may include multiple types of lock elision techniques. For example, these systems may support various combinations of locks, hardware mechanisms for transactional lock elision (e.g., HTM support), and/or software optimistic execution techniques, and may support optimizations that exploit various conditions to achieve various desirable properties.

It has been observed that the particular technique(s) best suited for executing a critical section in a particular circumstance may depend on a variety of different factors. For example, the choice of technique may depend on whether hardware transactional memory is available and, if so, whether it can (or does) successfully execute the critical section. For optimistic execution techniques, the suitability of a particular technique may be dependent on the workload. In one example, there may be many operations (e.g., 99% of the operations) that acquire the lock (e.g., in order to perform modifications), and one thread that repeatedly attempts to perform an optimistic read. In this example, the one thread that repeatedly attempts to perform an optimistic read may repeatedly fail to do so. In this case, it may be better for the reading thread to acquire the lock, rather than to continue to attempt to perform an optimistic read. However, if the workload is such that only one percent of the operations perform modifications (and acquire the lock), then an optimistic read operation will almost always succeed. With this type of workload, it may be appropriate to attempt an optimistic read operation, and if it fails to retry the optimistic read operation. This is because if the optimistic read operation fails once, it may be very likely to succeed the next time. Note that it may be very difficult for programmers to determine (ahead of time) a suitable policy for the order in which to try various ones of the available techniques and/or how persistent to be with each one before trying another without knowing what the target workload looks like and/or without knowing what the target execution platform may be.

In some embodiments, alternative synchronization mechanisms may be integrated to work correctly together, allowing the choice of mechanism to be made dynamically at runtime. This approach may be referred to herein, and generally, as "adaptive lock elision". In some embodiments, these choices may be made automatically and effectively (e.g., with good results) based on the behavior observed for the current application and workload.

In some embodiments, in order to support adaptive lock elision, the systems described herein may provide an infrastructure that allows programmers to integrate whichever lock elision techniques are available. For example, if HTM is available in the system to support transactional lock elision, the infrastructure may allow programmers to take advantage of that mechanism. Similarly, if using a software optimistic path is applicable (and feasible) for that critical section (which may require some additional programming, or at least compiler support, to ensure that no unsafe operations are performed while executing read operations in a read-only critical section), that path may be made available as a choice for or by the programmer. In some embodiments, a framework may be built in which there are multiple different instantiations of the same methods (e.g., using different lock elision techniques or combinations of lock elision techniques). For example, in some embodiments, the framework may apply one technique multiple times, collect various statistics about the application of that technique (e.g., how many times was is attempted, how many times was it successful, how much time was spent on attempting it before succeeding, and so on). In such embodiments, the framework may collect such statistics and/or profiling information, and may use this information to determine the best policy (or policies) to be used (or at least attempted) for the particular circumstances. In some embodiments, the framework may be configured to generate reports that programmers could examine when determining how to set various parameters (e.g., to make suitable choices between various techniques). In other embodiments, the framework may be configured to apply dynamic on-line policies that perform various monitoring operations to see which techniques are working best, and that automatically choose which techniques to try, how many times to try a particular technique before trying another option, etc.

The potential of this approach has been demonstrated by integrating two types of techniques for improving lock scalability (e.g., transactional lock elision (TLE) using hardware transactional memory (HTM), and optimistic software techniques) and by showing that a lightweight runtime library built for this purpose can adapt at runtime to achieve good performance on different platforms and different workloads. For example, a lightweight library may be configured to decide, at runtime, which of the mechanisms to apply and may be guided by one of a variety of pluggable policies. An evaluation of this example approach to integrating TLE and software optimistic techniques has been performed using four different platforms (two of which support HTM). Experiments with relatively simple static policies have demonstrated the importance of choosing execution modes based on observed runtime behavior. This evaluation has demonstrated that a relatively simple, proof-of-concept adaptive policy may (without requiring tuning for the platform and workload) almost always be competitive with, and may often significantly outperform, a hand-tuned static policy. As described later, the evaluation involved a HashMap microbenchmark, as well as a more complex open source database benchmark that demonstrates the use of adaptive lock elision with a readers-writer lock and nesting.

The work in this direction that is described herein has been focused initially on mutual exclusion locks, a common impediment to scalability. While scalability can sometimes be addressed by using finer-grained locks, that approach may significantly complicate the application code of a concurrent (e.g., multithreaded) application and could, in some cases, harm performance for some platforms and workloads. Thus, techniques for improving the performance of lock-based applications without forcing developers to implement finer-grained locking are attractive.

As noted above, a first demonstration of these ideas has shown that two techniques for improving scalability of lock-based concurrent (e.g., multithreaded) applications can work correctly together, and that a lightweight runtime library may be built such that it can effectively choose between the two techniques using profiling information collected by the library functions at runtime. The first technique is Transactional Lock Elision (TLE), which uses hardware transactional memory (HTM), if it is available, to execute critical sections of code in a concurrent (e.g., multithreaded) application concurrently without acquiring their associated locks (even those protected by the same lock). In some ways, TLE may be thought of as a form of optimistic execution, in that when it is executed, the hope (or assumption) is that it will succeed, but if it does not succeed, it does not do any damage and can be retried. This approach relies on hardware to detect whether this assumption is violated, and if so, to return control to the library to determine if, when, and how (e.g., using what technique) conflicting critical sections should be retried. The second technique is a form of optimistic execution in which most or all of an operation is performed (e.g., on an alternate software path) without acquiring the lock in the hope that no conflicting action occurs during the operation (in other words, in the hope that no concurrently executing operation conflicts with it). Note that, as used herein, the term "optimistic" may sometimes be used to refer only to software techniques that do not employ HTM, and not to possible HTM implementation characteristics. In case a conflicting action does occur, this is detected and the operation is retried, either using the same optimistic technique, or an alternative technique, such as acquiring the lock to ensure the operation can run to completion without interference.

Note that the techniques for improving lock scalability mentioned above may have different strengths and weaknesses in different contexts. For example, software optimistic execution may be highly scalable in read-dominated workloads but may be less effective as mutating operations become more frequent. On the other hand, TLE may be effective in significantly improving scalability even in the face of frequent mutating operations, provided those operations do not conflict too frequently. However, TLE depends on HTM being available and effective for the given workload. While there has been significant progress in implementing HTM in mainstream computing systems, it may be a long time before developers can depend on effective HTM support in every target platform. Furthermore, different HTM implementations may have different performance characteristics and different limitations. Therefore, even amongst platforms that do support HTM, different policies may be most effective. As described in more detail herein, by integrating these techniques so that they can interoperate, the choice of which technique to use in a particular case may become a heuristic choice that can be made at runtime.

As noted above, in some embodiments, an Adaptive Lock Elision (ALE) library may provide support for improving the scalability of legacy lock-based concurrent applications (e.g., multithreaded applications). In some embodiments, the ALE library may execute a given critical section in one of three modes: an HTM mode (e.g., one in which a hardware transactional memory supports transactional lock elision), a software optimistic execution mode (sometimes referred to herein as a "SWOPT" mode), and a Lock mode (e.g., a mode in which the lock associated with the critical section is acquired). The ALE library may integrate these techniques such that the choice of technique used to execute a given critical section can be made heuristically at runtime.

As described herein, in some embodiments, the ALE library may collect profiling information and make effective choices about which of two or more available mechanisms for executing a critical section to use, how often to retry them, when to backoff, etc., based (at least in part) on the collected profiling information. For example, the collected profiling information may be used by pluggable policies that are configured to determine at runtime how to execute each critical section. This approach may be preferable to programmers determining execution modes in advance, as the choices can be made automatically based on factors such as the platform, workload, and calling context. The collected profiling information may also be provided to programmers as guidance about which modes should be enabled for particular critical sections. In addition, the library may expose an interface to allow client code to communicate about certain events and to query certain state in order to facilitate some optimizations, and to allow the programmer to control and/or refine the granularity at which the profiling information (including various statistics) is collected. For example, the programmer may be able to control the granularity at which statistics are collected for a critical section based on the context in which it is called (e.g., a context that reflects the execution path that led to the critical section, the values of various arguments or variables that are relevant to the execution of the critical section, and/or other information about a specific execution of the critical section). In some embodiments, changing the granularity at which statistics are collected may, in turn, change the granularity at which policies are applied to adjust the number of attempts to execute a critical section using particular ones of the available execution mechanisms (e.g., during a learning phase).

The approach described herein for integrating alternative compatible synchronization mechanisms that may be used to execute critical sections and to detect conflicts when executing those critical sections and using a heuristic library to choose between alternatives may be used with many combinations of synchronization techniques, with the library being agnostic to the particular mechanisms used. An initial focus has been on the synchronization mechanisms mentioned above. The example programmer interface described herein is designed to be convenient for programmers in this case, and its implementation exploits knowledge and intuition about these techniques to improve performance and to support optimizations that are specific to it. Various ways in which this knowledge has been exploited are described below. For example, some lower-level mechanisms that may be supported in the ALE library and that may further improve performance include:

A mechanism for determining whether software optimistic executions are (or might be) running (sometimes referred to herein as a "could_SWOPTs_be_running" optimization)

A grouping technique in which executions that use the same optimization technique are grouped together for parallel or overlapping execution A technique for explicitly defining fine-grained conflict regions within critical sections In some embodiments, the ALE library may provide an interface for plugging in alternative policies that control which synchronization mechanism is used and when. Various results show that the profiling information collected by the library may enable effective dynamic policies that outperform simple policies such as static ones (e.g., policies that merely try one mechanism a pre-defined number of times, and then try another) and random ones (e.g., random policies that select one of two or more unintegrated synchronization mechanisms). The dynamic policies supported by the ALE library may include policies in which a sophisticated mechanism that draws on real-time experience and/or observations is used to drive decisions about when and/or how to switch between different mechanisms. In some embodiments, one of the policies supported by the ALE library may be a random policy that knows which techniques are available and that chooses one of the options (from among a collection of available synchronization mechanisms that have been integrated to work correctly together) at random (e.g., according to a random distribution). In general, the ALE library described herein may allow the programmer to collect statistics that are relevant to the choices to be made and that allow the programmer to influence these decisions (e.g., in a variety of different contexts). For example, one distinction between this approach and previous approaches for concurrent execution of critical sections may be that the application programmer may (e.g., using the ALE library) determine that a software alternative path may be effective for a given critical section and may add such a path in the code to correctly handle the interaction of that path with other execution techniques. For example, the ALE library may provide mechanisms with which the programmer can specify that only a portion of the critical section can actually conflict with another path (or paths), i.e., indicating a conflict only around this particular area. By contrast, phased transactional memory and other TM systems may merely use different mechanisms to execute the same application code. In some embodiments of the systems described herein, there may be a bit more burden on the application programmer to provide hints, directives, or other input for the use of the ALE library than was required in previous transactional memory systems. However, the systems described herein may exploit these inputs from the programmers to achieve much better performance than can be achieved using a standard transactional memory implementation (e.g., a generic STM-type implementation).

One embodiment of a method for implementing adaptive lock elision, as described herein, is illustrated by the flow diagram in FIG. 1. As illustrated at 110, in this example, the method may include beginning to execute code of an instrumented application, e.g., a concurrent (e.g., multithreaded) application that has been instrumented to take advantage of at least some of the lock elision techniques described herein. The method may also include encountering a critical section in the code that is associated with a lock (as in 120). For example, when the lock is held by a particular process or thread, it may prevent other threads or processes from entering the critical section and/or accessing concurrent data structures or other shared resources that are protected by the lock. In response to encountering the critical section of code, the method may include determining a context in which the critical section was encountered (as in 130). For example, the context may be determined based on one or more of: the environment or platform in which the instrumented application is executing, the availability of hardware features (e.g., hardware transaction memory support), the instrumented application itself, and/or various characteristics of the instrumented application (e.g., past, present, or anticipated workload characteristics, or other characteristics of the application).

As illustrated in this example, the method may also include determining a policy that is applicable to the determined context and that is usable in determining which, if any, of multiple integrated mechanisms for executing the critical section without acquiring the lock that is associated with the critical section (e.g., using hardware transactional memory or using an optimistic alternative path) should be employed (as in 140), and selecting one of the integrated lock elision mechanisms, dependent on the determined policy (as in 150). For example, in some embodiments, selecting one of the integrated lock elision mechanisms may include determining whether to attempt to execute the critical section of code using hardware transactional memory or using an optimistic alternative path. The method may also include attempting to execute the critical section using the selected one of the integrated lock elision mechanisms (as in 160).

As illustrated in this example, if the attempt to execute the critical section of code using the selected lock elision mechanism is successful (shown as the positive exit from 170), the method may include continuing to execute the code (as in 180). However, if the attempt to execute the critical section using the selected mechanism is not successful (shown as the negative exit from 170), the method may include retrying the critical section one or more times, using the same lock elision mechanism or a different lock elision mechanism (as in 190). Note that in some embodiments, if repeated attempts to execute the critical section of code using lock elision are unsuccessful, in order to execute the critical section of code, the system may revert to acquiring the lock (not shown). Note also that, in some embodiments, the determined policy may indicate that for particular critical sections and/or in particular contexts, the lock should be acquired in order to execute the critical section, rather than attempting to execute the critical section using a lock elision mechanism (e.g., TLE supported by HTM, or software optimistic execution), even if one or more such mechanisms are available.

As a demonstration of the adaptive lock elision techniques described herein, an example HashMap implementation is presented in detail below. In this example, the HashMap implementation, which is lock-based, integrates transactional lock elision (using hardware transactional memory) and software optimistic execution. In this example, the HashMap implementation enables three execution modes (a Lock mode, an HTM mode, and a SWOPT mode) and uses an ALE runtime library to determine (at runtime) which of these techniques to use and when. An example adaptive policy for determining which of these techniques to use (and when) has been developed as a proof of concept and has been evaluated against various static policies using a microbenchmark that exercises the example HashMap implementation in a variety of workloads. Other experiments conducted to evaluate the adaptive lock elision techniques described herein were performed using a benchmark of an open source database. These experiments were conducted on four different hardware platforms, two of which support HTM. At least one of the HTM-capable systems is commercially available. These experiments have shown that an adaptive policy of an ALE library can make effective choices to achieve good performance for a variety of workload mixes. In these experiments, the adaptive policy was always amongst the best performers, when compared to generic static policies, and often outperformed a hand-tuned static policy by a significant margin (e.g., for particular contexts and workloads).

In the Transactional Lock Elision (TLE) technique for improving lock scalability, hardware transactional memory (HTM) may be used to execute a critical section atomically while confirming that the lock is not currently held. If there are no data conflicts between two critical sections executed in this manner, then they can execute in parallel, even if they are protected by the same lock (as long as this lock is not held). Under certain circumstances, TLE may greatly improve the scalability of a lock-based application. However, if hardware transactions fail due to conflicts or because of a limitation on the transactions that are supported due to the underlying HTM implementation, the lock must be acquired in order to execute the critical section without HTM. If this happens frequently, performance can actually degrade, as compared to taking the lock. The success of a hardware transaction may depend on several factors that are not known in advance and may be unpredictable, such as how much data the transaction accesses, the way that this data is mapped to the cache mechanism of the particular architecture used, etc. Furthermore, the particular retry strategy that is most suitable for use in a given set of circumstances (e.g., a strategy for determining how many times to retry a particular transaction and/or whether and how long to back off before retrying the transaction) may be sensitive to (or dependent on) the particular HTM mechanism, the workload, etc.

Another approach for addressing lock bottlenecks is to employ one of a variety of mechanisms for performing optimistic execution, whereby operations are executed in such a way that, if they do no conflict with other operations, they complete successfully, but if a conflict does occur, no harm is done, and they can be retried. Such mechanisms may be considered "optimistic" because the hope is that need to for retries will be rare. One example of such a mechanism, a variant of which is described herein, is the use of a sequence lock (seqlock) to protect changes to data. A seqlock is a lock that has an associated sequence number. The sequence number is initially zero and is incremented each time the lock is acquired and released. An operation that needs to consistently read data that is protected by a seqlock can do so without acquiring the lock, provided other operations that may conflict with it do acquire the lock and increment the sequence number, and that it checks that the seqlock's sequence number is the same before and after reading the data (i.e., that the sequence number does not change while the data is being read). If the operation first waits until the sequence number is even (which may indicate that the lock is not held) these observations together may imply that the data did not change while it was being read.

In some embodiments of the systems described herein, rather than using hardware transactional memory to avoid having to acquire a lock on a critical section, a software optimistic execution approach may be used. For example, one way of performing optimistic execution (which is not, strictly speaking, lock elision, but is closely related) may be to require any process or thread that is attempting to perform a mutating operation (e.g., writing) in a critical section to acquire the lock as usual and also to increment a version number associated with the lock when they acquire it and again before they leave the critical section (or release the lock). In some embodiments, this approach may allow other processes or threads that are only going to read in the critical section to do so without having to acquire the lock. In this example, any process or thread that is only going to read in the critical section may take a snapshot of the version number, determine whether the version number is even (indicating that no other process or thread is holding the lock), or wait for the version number to be even, and then do their reading in the critical section without acquiring the lock. When the process or thread is finished doing its reading, it may check the version number to determine whether any other process or thread acquired the lock while it was doing its reading. If the version number has not changed since the snapshot was taken, this may indicate that no other process or thread has acquired the lock and/or that no process or thread has modified the protected data.

In this example, if another process or thread does acquire the lock and change the protected data while the one process or thread is reading it, this could result in the reader process or thread reading inconsistent data. In some cases, reading inconsistent data due to such a concurrent change in the protected region, or by the critical section, could lead to a dangerously bad result (e.g., crashing the program). In some embodiments, the code that is doing the reading may be augmented such that if an inconsistent read could cause a bad result, the reader code would again check whether the version number has changed. If the version number has changed, the reader code may abort the path that leads to the bad result, discarding any data that was read in the critical section, and entering the critical section again (with or without acquiring the lock). On the other hand, if the version number has not changed, the reader code may know that the data is consistent up to that point. This is one example of the execution of a critical path using a SWOPT (software optimistic) technique.

Techniques for optimistic reading, such as the one described above, are similar to TLE in several ways. For example, optimistic reading may fail due to concurrent updates, and it may be retried or the lock may be acquired in case the optimistic reading is repeatedly unsuccessful. In some embodiments, the success or failure of optimistic reading may depend on a number of factors, including aspects of the workload that may change over time. Despite their similarities, different situations may favor the use of particular ones of these lock elision type techniques. As previously noted, optimistic execution may be highly scalable in applications that exhibit read-heavy workloads but may be less effective as mutating operations become more frequent. On the other hand, TLE may significantly improve the scalability of lock-based applications even in the face of frequent mutating operations, provided they do not conflict too frequently. However, TLE depends on HTM being available and effective for the given workload. TLE and optimistic reading do not interoperate effectively if combined naively (i.e., without taking steps to integrate these techniques). For example, although critical sections that update data may succeed concurrently using TLE, as discussed above, they may always conflict with each other if a seqlock is used, due to the need to increment the sequence number (twice) for each critical section execution. As described herein, in some embodiments, such conflicts may be reduced, and even eliminated in some cases, significantly improving performance and scalability.

As described herein, in some embodiments, TLE and optimistic execution may be combined in such a way that either technique can be used effectively, and the choice of which one to use may be made dynamically, depending on the availability and behavior of each option for the current platform and workload. As previously noted, some embodiments may make use of an ALE library that collects profiling information and supports pluggable policies that can make dynamic decisions about which lock elision type techniques to use and when. This may allow programmers to get the "best of both worlds" of TLE and optimistic execution. As described herein, optimistic execution and TLE may both be viewed as forms of "lock elision", in that operations executing using these techniques may complete without acquiring the lock, may fail due to concurrent updates and may be retried (eventually acquiring the lock if repeated attempts to execute the operations without holding the lock are unsuccessful).

There are some existing techniques for integrating multiple synchronization techniques and choosing between them dynamically (at runtime). For example, one reactive locking algorithm can switch between fast and scalable alternatives for locking depending on the workload. While this algorithm can adapt differently for different locks, unlike the adaptive lock elision techniques described herein, this existing technique does not support concurrent use of different techniques for different critical sections for the same lock, and does not exploit techniques such as TLE or optimistic execution. In another example, an Adaptive Transactional Memory approach uses profiling and machine learning techniques to adapt between two or more software TM (STM) implementations. However, unlike with this existing approach, the adaptive lock elision techniques described herein may be applied to an established lock-based programming model that does not require new compiler and language support, may exploit HTM, and may avoid the significant system support required for STM and a full transactional programming model. Thus, the adaptive lock elision techniques described herein may be more pragmatic and more immediately practical than these existing approaches.

Using the ALE Library

The ALE library interface programmers use to apply these techniques may be illustrated using the following example: a HashMap data structure protected by a single lock. In this example, an Insert operation inserts a new key-value pair into the HashMap if the key is not already present and overwrites the value associated with the key otherwise. A Remove operation removes the specified key if it is present and has no effect otherwise. A Get operation copies the value associated with the specified key to a specified memory area and returns true if the key is present, or false otherwise. In a base implementation, the HashMap is protected by a single lock, referred to as "tblLock", and every operation is executed in a single critical section that holds this lock. An example technique for integrating this implementation with ALE, and for enabling the use of HTM mode with it is described below, as is an explanation of how to add a SWOPT execution alternative.

In various embodiments, the ALE library described herein may be used by both C and C++ programs. A header file ALE.h may provide macros that programmers use to identify locks and associated critical sections for which ALE should be used, amongst other functionality introduced later. An example of how locks may be enabled for ALE is described below, beginning with a baseline implementation that only allows the use of HTM, and then introducing the use of an optimistic software-based alternative.

In various embodiments, programmers may use ALE with any type of lock, including multiple types of locks in the same application and even multiple locks for the same critical section (e.g., a critical section may be executed using different locks at different times). An explanation of how this flexibility is accommodated is described below. In some embodiments, enabling a lock for use with ALE may be achieved via two relatively minor changes. The first, in the same scope as the lock's declaration, may associate a label with the lock and cause metadata to be declared for the lock. The second, in the same scope as the lock initialization code, may cause the library to initialize this metadata. The type and name of the metadata may be transparent to the programmer, and all communication with the library for a given lock may use the label associated with the given lock.

For each target lock (i.e., each lock for which ALE will be used), the programmer may declare (e.g., in the same scope as the lock) additional metadata for use by the library, as shown in the pseudocode below:

```
1    class HashMap {
2        ...
3        MyLockType tblLock; // Lock
4        LOCK_INFO_DECLARE(md_tblLock); // Metadata
5    };
```

In this example, all communication with the library may use the metadata label passed to the LOCK_INFO_DECLARE macro (md_tblLock, in this example), from which the library may construct the metadata variable name.

The metadata may be initialized near where the lock is initialized, for example in a constructor, as shown in the pseudocode below:

```
1    HashMap::HashMap(/* Constructor arguments */) {
2        ...
3        lockInit(&tblLock); // Initialize lock
4        LOCK_INFO_INIT(md_tblLock); // Initialize metadata
5    }
```

Similar macros may be used to declare metadata to be associated with locks declared as static or global variables.

In this example, a programmer may also create an instance of lock_api_t for each type of lock used by the application, as in the example pseudocode below:

```
1    typedef struct {
2        void (*lock)(void *);
3        void (*unlock)(void *);
4        uint32_t (*is_locked)(void *);
5    } lock_api_t;
```

This lock structure may provide pointers to functions for the library to acquire and release the lock (e.g., using the "lock" and "unlock" methods, respectively), and to determine whether the lock is currently held (e.g., using the "is_locked" method). In some embodiments, the is_locked function may be called within hardware transactions when executing a critical section in HTM mode, allowing the hardware transaction to ensure that it commits successfully only if the lock is not held. The is_locked function may be supported directly by the given lock type, or may be implemented by the programmer, in different embodiments. In some embodiments, the is_locked function may not be required to return true if and only if the lock is held. As explained in more detail below, a conservative approximation may suffice, in which the is_locked function returns true if some thread may be executing code in a critical section while holding the lock, but may return false if, for example, a thread has acquired the lock but has not yet executed the first instruction in the critical section, or has finished executing all of the instructions in the critical section but has not yet finished releasing the lock. This approach may allow ALE to be used with any lock type, including common lock types (such as pthread_mutex_t) that do not provide an is_locked function. In some embodiments, this may be achieved by associating a separate Boolean variable with each lock, and using wrapper functions to set this variable after acquiring the lock and to clear it before releasing the lock, thus allowing the is_locked function to be implemented simply by returning the value of this variable.

In some embodiments, a baseline critical section (e.g., one for which no optimistic alternative is available) may be modified for ALE, so that it can be executed using TLE. This may be achieved by replacing the acquire and release calls at the boundaries of the critical section (e.g., calls to lock and unlock methods) with BEGIN_CS and END_CS macros, respectively, indicating the appropriate lock_api_t instance, any arguments its functions may require, and the lock metadata label. This modification is illustrated in the example pseudocode below:

```
1     // Old lock code: Lock(&tblLOCK);
2     BEGIN_CS (&MyLockAPI, &tblLOCK, md_tblLOCK);
3     {
4         // critical section
5     }
6         END_CS (&MyLockAPI, &tblLOCK, md_tblLOCK);
7     // Old unlock code: UnLock(&tblLOCK);
```

In this example, the BEGIN_CS and END_CS macros both take three arguments: a pointer to the lock's API, an argument to pass to the lock's API functions, and the metadata label for the lock. In this example, the first two arguments may allow the library to access the lock, and the third may allow the library to access the lock's metadata. Another macro, BEGIN_CS_NAMED may be similar to BEGIN_CS, but this macro may also accept a descriptive name to be associated with the critical section.

In some embodiments, this may be all that is required to enable the critical section to be executed using TLE. Once this replacement has been made in all three HashMap methods, the ALE library may collect statistics and profiling information for the critical sections for reporting and/or to guide decisions about when to use HTM and when to acquire the lock as normal. In other words, even without using the HTM or SWOPT modes, the ALE library's reports may provide significant insights that can provide guidance about which critical sections are promising targets for enabling other execution modes. This may be particularly useful in larger and more complex examples. Having integrated lock(s) and associated critical section(s) with ALE as described above, enabling the use of HTM mode for these critical sections may be performed by including appropriate compilation flags for the application and library.

Note that not all critical sections associated with a lock may need to be modified to use the library's API. However, in some embodiments, the is_locked function must be aware of any critical section that may execute concurrently with an ALE-enabled critical section protected by the same lock. In some embodiments, if a reentrant lock is acquired by a critical section that is nested within an ALE-enabled critical section that acquires the same lock, then the nested critical section must also use ALE's API. Furthermore, some contention management mechanisms used by some policies may not function correctly if some critical sections protected by the same lock do not use the ALE library.

As noted above, in some embodiments, the ALE library may be used to collect statistics about the execution of critical sections, and to generate reports and/or store the collected information for the use of various library functions (automatically). One embodiment of a method for collecting statistics about the execution of critical sections of code and/or other profiling information is illustrated by the flow diagram in FIG. 2. As illustrated at 210, in this example, the method may include instrumenting the code of an application that includes at least one critical section associated with a lock so that an ALE-enabled library is used for the critical section(s). For example, the method may include instrumenting the code to take advantage of at least some of the lock elision techniques described herein. Note that the application code may include more than one critical section that is associated with same lock or may include two or more critical sections that are associated with different locks, in different embodiments.

As illustrated in this example, the method may include beginning to execute the instrumented code, as in 220, and encountering a critical section in the code (e.g., one that is associated with a lock), as in 230. In response to encountering the critical section, the method may include invoking a library function to determine the method to use to execute the critical section according to its execution context and applicable policies, as in 240. The method may include the library function collecting and storing information about execution of the critical section, and determining a new context and/or policy to be applied, as needed, as in 250. For example, the library function may be configured to collect and store information indicating how often each ALE-enabled critical section was executed, how many times each method (TLE, SWOPT, or acquiring the lock) was attempted and/or was successful, how much time was spent using each method, and/or other information about the execution of various critical sections. In some embodiments, the library function may employ statistics counters (e.g., those that use sampling or a statistical counter algorithm) to update and/or store counts of events (e.g., the number of times that a critical section is executed using a given method), as well as time interval information (e.g., an average lock acquisition time). After determining the method to be used to execute the critical section, the library function may return to the user code, which will execute the critical section using the method determined by the library function (e.g., in a hardware transaction that was begun by the library function or using the SWOPT path), as in 255.

Figure 2:
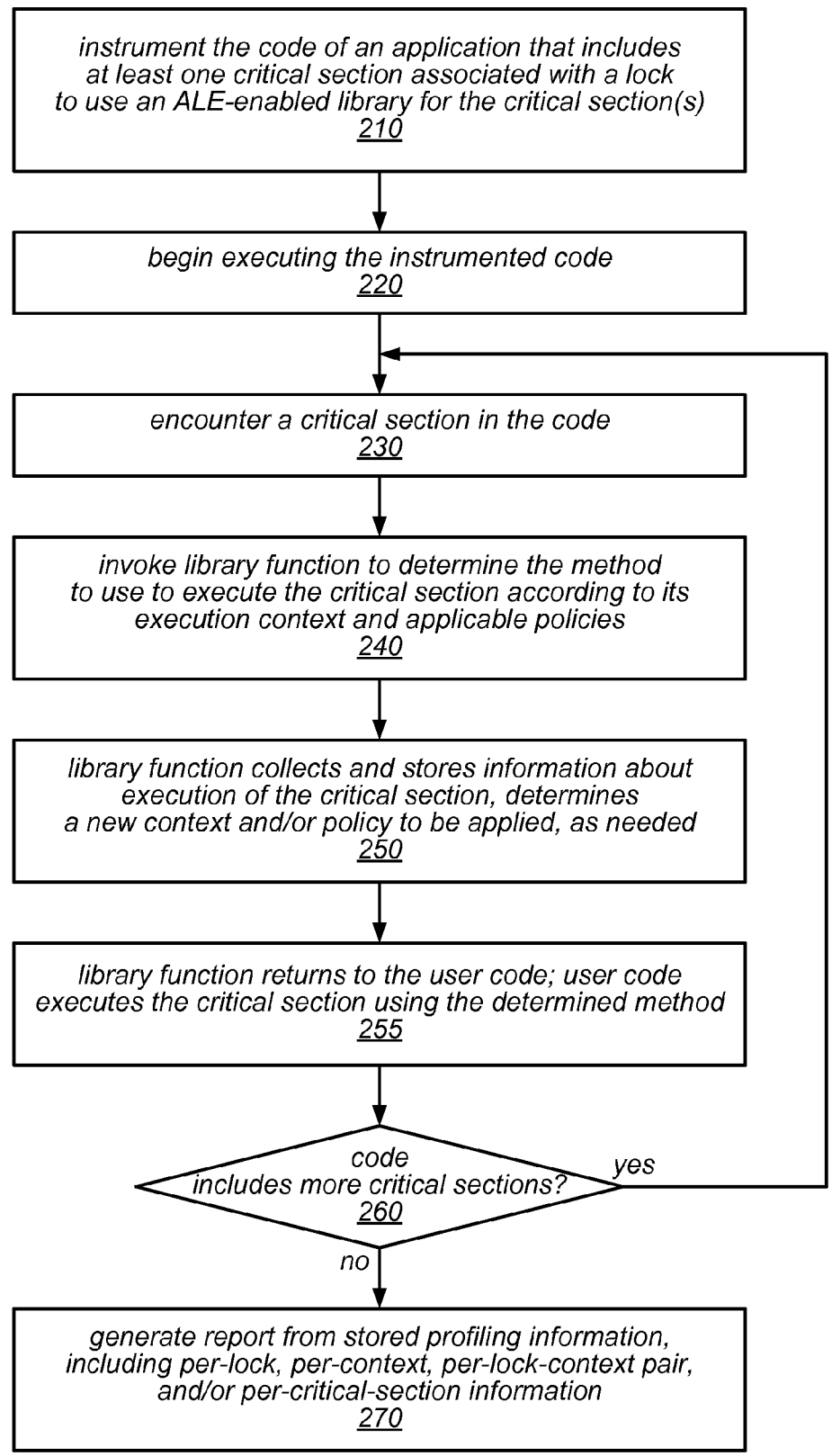
FIG. 2 is a flow diagram illustrating one embodiment of a method for collecting statistics about the execution of critical sections of code and/or other profiling information, as described herein.

If the code includes more critical sections (e.g., critical sections associated with the same lock or another lock), the method may include repeating the operations illustrated in 230-250 for each additional critical section. This is shown in FIG. 2 by the feedback from the positive exit of 260 to 230. On the other hand, if the code does not include any additional critical sections (or once all of the critical sections in the code have been executed), the method may include generating a report based on the stored profiling information, which may include per-lock, per-context, per-lock-context pair, and/or per-critical-section information (as in 270). For example, in some embodiments the method may include the library function (or another library function of the ALE library) producing a report that summarizes the collected information for each ALE-enabled lock, as well as breaking this information out per ALE-enabled critical section associated with the lock. As described herein, in some embodiments, even if a scoped lock has only a single critical section at the source level, statistics may be associated with the context within which the constructor is called. In such embodiments, various policies may be applied to collect and use separate statistics per context.

Adding an Optimistic Alternative

In some embodiments, it may be relatively simple to enable a critical section to use HTM, as described above, because changes may only be required to be made at the boundaries of the critical section, and not to the critical section code itself. However, adding an optimistic alternative may be more complicated. In particular, optimistic critical section code can be executed concurrently with other critical section code that may cause the optimistic critical section to observe inconsistent data (if it is executing in HTM or Lock mode). In some embodiments, it may be the programmer's responsibility to ensure that the optimistic critical section code can detect such interference in order to retry in this case, and to ensure that unsuccessful attempts have no harmful side effects. The HashMap example described herein illustrates one way to achieve this.

In some embodiments, ALE may support optimistic execution by executing critical sections for which an optimistic alternative is available in a special SWOPT mode for this purpose. This optimistic alternative may be referred to as a "SWOPT path". In some embodiments, a SWOPT mode may be enabled for a critical section by using a variant of the BEGIN_CS macro that indicates that a SWOPT path is available, and by adding code to the critical section for that path. In such embodiments, this path may be executed when the critical section runs in SWOPT mode, as indicated by a GET_EXEC_MODE macro that is provided by the ALE library. For example, variants of the BEGIN_CS macro may be provided that accept an argument indicating whether a SWOPT path is available. If so, the library may choose to execute this SWOPT path, and a GET_EXEC_MODE macro may allow the critical section code to determine whether it is executing in this mode.

Note that there may be many different approaches for constructing SWOPT paths, in different embodiments. For example, an approach that is similar to the use of sequence locks, as described earlier, may be quite effective for a variety of applications, platforms, and workloads. However, naïvely using the sequence lock to directly replace the underlying lock may have several drawbacks. For example, as discussed herein, this approach may lose the benefit of TLE. Moreover, this naïve approach may have disadvantages even if HTM is not available (in which case, TLE is not possible). In particular, with this approach, the entire critical section is executed between the two increments of the sequence number when the lock is acquired, preventing successful execution of any SWOPT path associated with the same lock for this entire interval. However, this may be unnecessary if the critical section executed while holding the lock rarely performs conflicting actions or if conflicting actions can occur only during a small fraction of the execution of the critical section. In one example, the code in a critical section may search for an item and when (and if) the item is found, make a change to that item. In this example, the portion of the code that performs the search may be able to run concurrently with other processes or threads that are executing using SWOPT paths because the search will not cause a conflict with the other processes or threads. It is only when (and if) a change is made to the item that there is a risk of conflicting with the other processes or threads.

For at least these reasons, in some embodiments it may be advantageous to explicitly identify code regions that may potentially, though not necessarily, perform conflicting actions rather than to conservatively assume that any part of the critical section may do so by default. In some embodiments, explicitly identifying conflicting regions may allow SWOPT executions of critical sections using the same lock to detect interference. In some embodiments, by explicitly marking the portions of the critical section that may potentially perform conflicting actions, the length of time during which an operation may cause concurrent optimistic executions to have to retry may be significantly reduced.

In some embodiments, potential conflict regions may be marked conservatively. In other words, while any portion of the code that does present a potential conflict must be marked as a potential conflict region, other portions of the code may be marked as potential conflict regions that do not happen to present a potential conflict (or for which it is unclear whether they could potentially cause a conflict). Note also that the fact that a portion of the code is explicitly marked as a potential conflict may mean that in some circumstances, the potential for a conflict is present, while in other circumstances there may be no potential for conflict. In some embodiments, a portion of the code may be marked to indicate a conflict or potential conflict for some period of time (e.g., for some executions), but may be unmarked at other times (e.g., for other executions). In other embodiments, if it is not known whether there is going to be a conflict (or potential conflict) for a portion of the code, that portion of the code may be (optimistically) left unmarked. In this case, execution may proceed under the assumption that there will not be a conflict. However, if it is subsequently determined that there is a potential conflict for that portion of the code, the execution of that portion of the code may need to "self abort" (e.g., the optimistic execution may need to be stopped prior to causing a conflict), or the version number may need to be incremented (thus marking the code as conflicting, or potentially conflicting). In general, the ability to explicitly mark various portions of the critical section as conflicting or potentially conflicting may provide a level of flexibility to programmers that does not exist with other approaches to improving lock scalability.

In some embodiments, programmers using ALE to integrate SWOPT execution into a critical section may need to follow a few straightforward rules, such as the following:
 Interference with a SWOPT path should be caused only by concurrent execution of a critical section protected by the same lock while not in SWOPT mode.
 Executions must provide the means for a SWOPT path to detect any (potential) interference they cause.
 Non-optimistic executions of critical sections must identify any actions that may cause such interference.
 Critical sections executed in SWOPT mode must avoid any harmful side effects due to such interference.
 SWOPT executions that experience interference must be explicitly retried (if desired) in the case of interference, after notifying the library of the failed attempt.

In some embodiments, a SWOPT path that encounters interference may call a FAIL_SWOPT_ATTEMPT macro, which may allow the library to take the failed attempt into account in future decisions about whether to execute the critical section in SWOPT mode.

In some embodiments, to apply the ideas discussed above to the HashMap example, the programmer may first add to the class a (volatile) version number field tblVer, which is initialized to zero. The programmer may also add BeginConflictingAction and EndConflictingAction methods (both of which simply increment tblVer) and a GetVer method, which returns the value of tblVer, optionally waiting until it is even (if its Boolean argument indicates this is required). Note that in some embodiments, concurrency may be improved by using multiple version numbers, without changing the locking granularity of the application. For example, there may be a different version number associated with each bucket of the HashMap. In this example, interference could occur only between critical sections that are accessing the same bucket.

In this example, the first two methods may be used to bracket portion(s) of non-optimistic critical section code that may interfere (or potentially interfere) with concurrent SWOPT execution of a critical section protected by the same lock. As previously noted, identifying conflicting regions within critical sections in this way may allow SWOPT executions of critical sections using the same lock to detect interference. If no operations are executing in SWOPT mode, the conflict notification described above may be unnecessary, and may cause unnecessary conflicts between critical sections in HTM mode. In other words, hardware transactions that enter critical sections may have to increment the version number for the lock to allow concurrent execution of SWOPT paths to detect any interference from them, unless they know that no SWOPT paths is executing concurrently with them. In some embodiments, a could_SWOPTs_be_running library macro may return a (possibly conservative) indication of whether a critical section associated with the same lock is (or could be) executing in SWOPT mode. This mechanism may support an optimization that avoids these unnecessary potential sources of conflict. For example, if the hardware transactions can know that there cannot be any SWOPT paths running concurrently, the hardware transactions may not need to increment the version number when entering and exiting the conflicting region of the critical section, which may allow them to run concurrently in situations in which they could otherwise conflict when incrementing the version number. In other words, the use of a could_SWOPTs_be_running library macro may allow executions in HTM mode to skip the conflict indication when no SWOPT path is running, and thus avoid unnecessary aborts due to modifications of tblver, in this example. Note that, because this optimization may depend on HTM to abort the critical section if a SWOPT execution begins after the could_SWOPTs_be_running macro has returned, the could_SWOPTs_be_running macro may always return true, disabling the optimization, except in HTM mode. In other words, this benefit of the could_SWOPTs_be_running optimization may be realized only when SWOPT paths are potentially used together (concurrently) with an HTM mode.

In various embodiments, the could_SWOPTs_be_running mechanism described above may be used to optimize the execution of critical sections based on what sorts of executions might be running concurrently. Some embodiments may include an optimization in which the part of the critical section that indicates the conflict may be conditional on whether there could be optimistic executions running. In some such embodiments, this functionality may be implemented using a scalable non-zero indicator (SNZI), such that any SWOPT path that is going to run first arrives at a SNZI object associated with the lock being elided for that SWOPT execution and departs the SNZI object afterward. A SNZI object may be similar to a counter, and may include an underlying counter. In some embodiments, a process or thread that arrives at a SNZI may increment the underlying counter, and a process or thread that departs the SNZI may decrement the underlying counter. However, queries directed to a SNZI object may return an indication of whether the value of the counter is zero or non-zero, rather than returning a precise value for the counter (if non-zero). In this example, a hardware transaction may query the SNZI object to determine whether or not there are SWOPT paths currently running. If not, the hardware transaction may not need to indicate a conflict (e.g., by incrementing the version number for the lock). If a process or thread subsequently arrives at the SNZI object (thus changing the value of the SNZI object from zero to non-zero), this may cause that hardware transaction to fail.

Note that the could_SWOPTs_be_running macro may not need to be implemented in a precise manner, but rather may be implemented conservatively. For example, in some embodiments, the could_SWOPTs_be_running library macro may return false if and only if it can be determined that there are not (and cannot) be any SWOPT paths executing, and may return true, otherwise. In another example, if the could_SWOPTs_be_running macro always returns "true", this may not necessarily mean that any SWOPT paths are currently executing. Rather, a "true" result may merely mean that they could be (which is a correct answer in this case, even if not sufficient.) Note, however, that there may be many different ways to implement the could_SWOPTs_be_running library macro, some of which may return a precise answer (e.g., they may return true if and only if there are SWOPT paths executing, and may return false if and only if there are no SWOPT paths executing).

Figure 3:
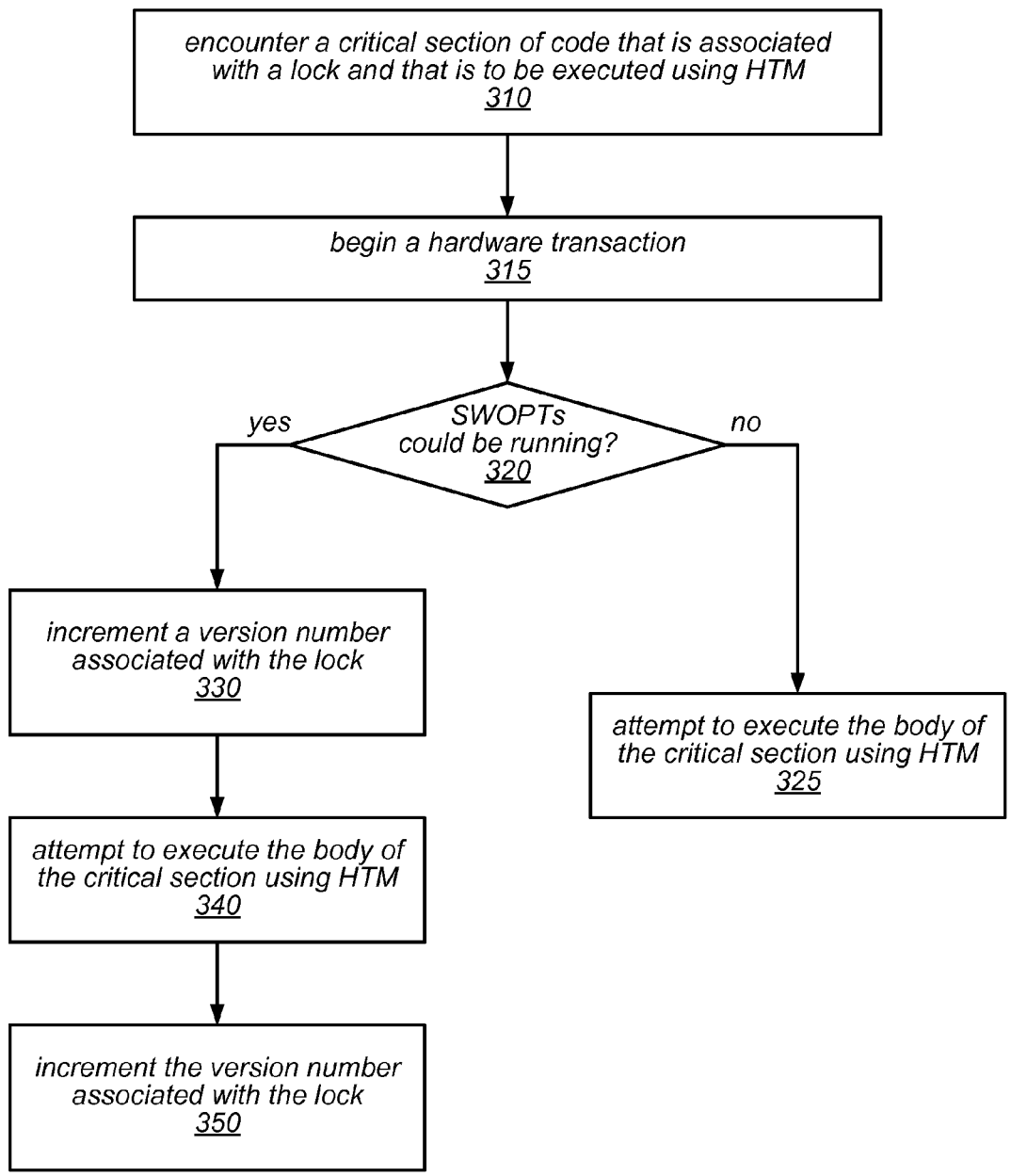
FIG. 3 is a flow diagram illustrating one embodiment of a method for leveraging a function for determining whether SWOPTs could be executing, as described herein.

One embodiment of a method for leveraging a function for determining whether SWOPTs could be executing is illustrated by the flow diagram in FIG. 3. As illustrated at 310, in this example, the method may include encountering a critical section of code that is associated with a lock and that is to be executed using hardware transactional memory, and beginning a hardware transaction (as in 315). If a function for determining whether SWOPTs could be running determines that no SWOPTs could be running (shown as the negative exit from 320), the method may include attempting to execute the body of the critical section (or at least the potentially-conflicting portion of the critical section, if marked) using hardware transactional memory, as in 325. In the example, the attempt to execute the body of the critical section using hardware transactional memory may succeed or may fail, in which case it may be retried one or more times (not shown).

On the other hand, if the function for determining whether SWOPTs could be running determines that SWOPTs could indeed be running (shown as the positive exit from 320), the method may include (within the hardware transaction) incrementing a version number associated with the lock (as in 330), attempting to execute the body of the critical section (or at least the potentially-conflicting portion of the critical section, if marked) using hardware transactional memory (as in 340), and then, once the attempt to execute the body of the critical section is complete (e.g., whether it succeeds or fails), incrementing the version number associated with the lock (within the hardware transaction), as in 350. For example, in some embodiments, the entire critical section may be bracketed by the increment operations. In other embodiments, only a particular portion of the critical section containing instructions that, when executed, could potentially cause conflict with a SWOPT execution associated with the same lock may be bracketed by the increment operations (in which case, other portions of the critical section code may execute before 330 and/or after 350).

Note that in some other embodiments, since the increment operations and the critical section (or potentially-conflicting portion thereof) are executed within a hardware transaction, the order of these operations may be irrelevant, and may be different than that illustrated in FIG. 3. For example, in some embodiments, the version number may be incremented by two as the last operation performed within the transaction, rather than being incremented once before and once after an attempt to execute the body of the critical section. Note also that in some embodiments, if an attempt to execute the critical section fails, it may be retried one or more times before the attempt is abandoned (not shown). In such embodiments, in the case of a retry, all of the operations of the hardware transaction (including the attempt to execute the critical section at 325 or 340, the query to determine whether SWOPTs could be running at 320 and, if so, the two increment operations at 330 and 350) will be retried.

In the example HashMap implementation described above, the GetVer method may be used both for reading the version number at the beginning of an SWOPT execution of a critical section (after waiting until tblVer is even), and for checking whether the version number has since changed (in this case there may be no need to wait for the version number to be even because if it is not, it has changed).

As previously noted, the example HashMap implementation described above supports the following operations: an Insert operation that inserts a new key-value pair if the key is not already present and overwrites the value associated with the key otherwise; a Remove operation that removes the specified key if it is present and has no effect otherwise; and a Get method that copies the value associated with the specified key to a specified memory area and returns true if the key is present, or returns false otherwise.

One candidate into which SWOPT execution could be incorporated is the Get method, as this operation does not change shared data, and therefore concurrent executions of this method do not cause conflicts for each other. In order to incorporate a SWOPT path, any potential conflicts may first be identified. In this example, A SWOPT execution of Get can experience interference from a concurrent Insert or Remove operation.

Basic versions of the Insert and Remove methods (including the Remove method shown below) may each include a single critical section (introduced using the BEGIN_CS macro). Each of these methods may first perform a search to determine if the specified key is present. While the searches themselves cannot cause conflicts for a concurrent Get operation, conflicting actions may in some cases be performed by concurrent Insert or Remove operations. For example, the Remove method can cause a conflict for a concurrent Get operation in the case that the specified key is found, which would require a node to be removed. In this example, only the code performing the final step of removing the node may need to be identified as code that may potentially cause a conflict (e.g., by using BeginConflictingAction and EndConflictingAction). In cases in which the specified key is not found, there may be no conflicts at all.

One example of a Remove operation that explicitly identifies a conflicting region within a critical section is illustrated by the pseudocode below:

```
1    BEGIN_CS(&LockAPI, &tblLock, md_tblLock);
2    < search a node containing a given key>
3    if ( < node is found > ) {
4        BeginConflictingAction( );
5        unlink( < node > );
6        EndConflictingAction( );
7    }
8    END_CS(&LockAPI, &tblLock, md_tblLock);
```

In this example, md_tblLock represents the metadata label associated with tblLock, as described above. In this example, LockAPI is a structure that identifies methods used to acquire and release this lock, as well as an is_locked method that is used to check and monitor a lock when an associated critical section is executed in HTM mode. As illustrated above, the "unlink" operation, which removes a specified node, is marked as a conflicting region of the critical section code, and this operation is only performed if the specified node is found. Otherwise, execution of the critical section will not conflict with concurrent Get operations. In some embodiments, this fine grained bracketing approach may enable the ALE library to be used with any type of lock.

In this example, the Insert method may potentially cause conflicts only during the last part of its operation. For example, if a node having the specified key is not found, a new node is allocated and initialized, and is then linked into the list of the appropriate bucket. This operation to link the new node into the list may potentially cause a conflict with a concurrent Get operation. On the other hand, if a node having the specified key is found, then the portion of the critical section code responsible for copying the new value to the appropriate node may potentially cause a conflict. Thus, the Insert method includes two conflict regions, in this example, and these conflict regions may be explicitly (and separately) identified in a critical section within the code for the Insert method using BeginConflictingAction and EndConflictingAction methods, as in the Remove method above.

The example pseudocode shown below may be used to explain how a SWOPT path can be integrated into the Get method, in one embodiment. In this example, the integration begins by creating a utility method GetImp which factors out the main functionality of the Get method, and returns −1 if a SWOPT execution fails, 1 if it succeeds (or was not attempted) and the key was found, and 0 otherwise (including if not in SWOPT mode).

```
1    template <bool optExec>
2    int32_t HashMap::GetImp(const & key_t key,
3            uint32_t hVal, value_t& retVal) {
4        uint32_t v;
5        if(optExec) v = GetVer(true);
6        hVal = hVal % this->numBuckets;
7        Bucket* barr = buckets;
8        if (optExec && (v != GetVer(false)))
9            return −1;
10       BucketNode* bP = barr[hval].firstNodeP;
11       if (optExec && (v != GetVer(false)))
12           return −1;
13       while (bP && !keyEqual(bP->key, key)) {
14           bP = bP->next;
15           if (optExec && (v != GetVer(false)))
16               return −1;
17       }
18       if(bp != NULL) {
19           // assumes value_t has assignment operator
20           retVal = bp->val;
21           if (optExec && (v != GetVer(false)))
22               return −1;
23           return 1;
24       }
25       return 0;
26   }
```

Through the use of a Boolean template argument optExec (which specifies whether or not the Get operation is to be executed in SWOPT mode), this approach effectively creates two versions of the GetImp method (one for use in SWOPT mode and one for use in other modes). This approach may remove the need to write and maintain two variants of the code, which would be identical except for the code needed by the version to be used in SWOPT mode (shown in italics). This approach may also avoid imposing any overhead on the non-optimistic version in order to support the optimistic (SWOPT) version of the method. A similar approach may be employed to create or modify the code of other lock-based applications for use with the adaptive lock elision techniques described herein.

In this example, the main difference between the SWOPT version and the regular (non-optimistic) version of the function is the addition of the validation statements in lines 8, 11, 15, and 21 when executing in SWOPT mode that checks that the version number has not changed since it was read at line 5. In this example, in the absence of compiler support for this purpose (i.e., for adding validation statements to programmatically created and/or instrumented SWOPT paths), the programmer may have added these validation statements manually. In various embodiments, a general rule of thumb may be to include such a validation before using any value that was read since the last such validation. However, in some embodiments, some validations may be omitted if the value that was read is used in a way that cannot cause any error, even if it is invalid. Note that in some embodiments, when optimistically reading data, there may be a small chance that the data has already been deallocated, and that the page in which it resides has been returned to the operating system and removed from the address space, causing an error. Techniques for avoiding this issue, where it exists, may be system-specific. This issue does not apply in many cases, e.g., in those in which the application does not deallocate memory during its lifetime, or in which the operating system does not deallocate freed pages. In some other contexts, this issue may be addressed by using non-faulting loads.

In this example, the Get method itself may be implemented as a wrapper method that uses the BEGIN_CS_EXTENDED macro to begin a critical section. This macro may be similar to the BEGIN_CS macro, but may allow the programmer to specify whether HTM can be used and whether alternative SWOPT path exists. In this example, there is such an alternative available. Therefore, the critical section may use the GET_EXEC_MODE macro to determine whether the critical section is being executed in SWOPT mode. If not, it calls GetImp<false> to complete the lookup. On the other hand, if the critical section is being executed in SWOPT mode, it instead calls GetImp<true>, which may return −1, indicating that it did not complete successfully due to a conflict. Because of this possibility, the Get method may be executed inside a loop that terminates when the non-optimistic version is executed, or when the SWOPT version is executed and completes successfully, returning a value other than −1. In some embodiments, the ALE library may contain some additional macros that allow this common pattern (and/or other common patterns) to be expressed concisely.

Figure 4A:
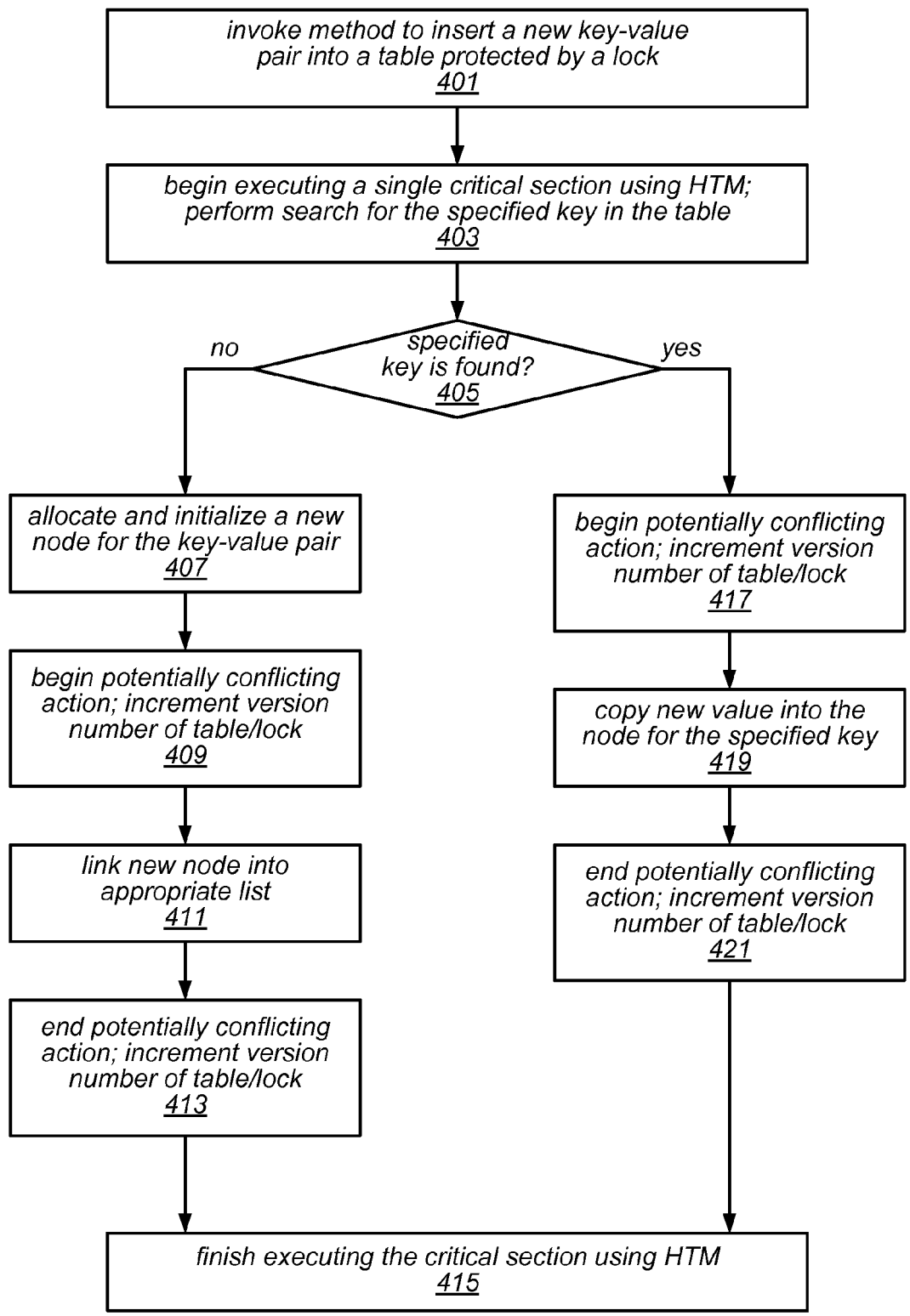
FIGS. 4A-4B are flow diagrams illustrating one embodiment of a method for integrating hardware transactional memory and a SWOPT path, as described herein.
Figure 4B:
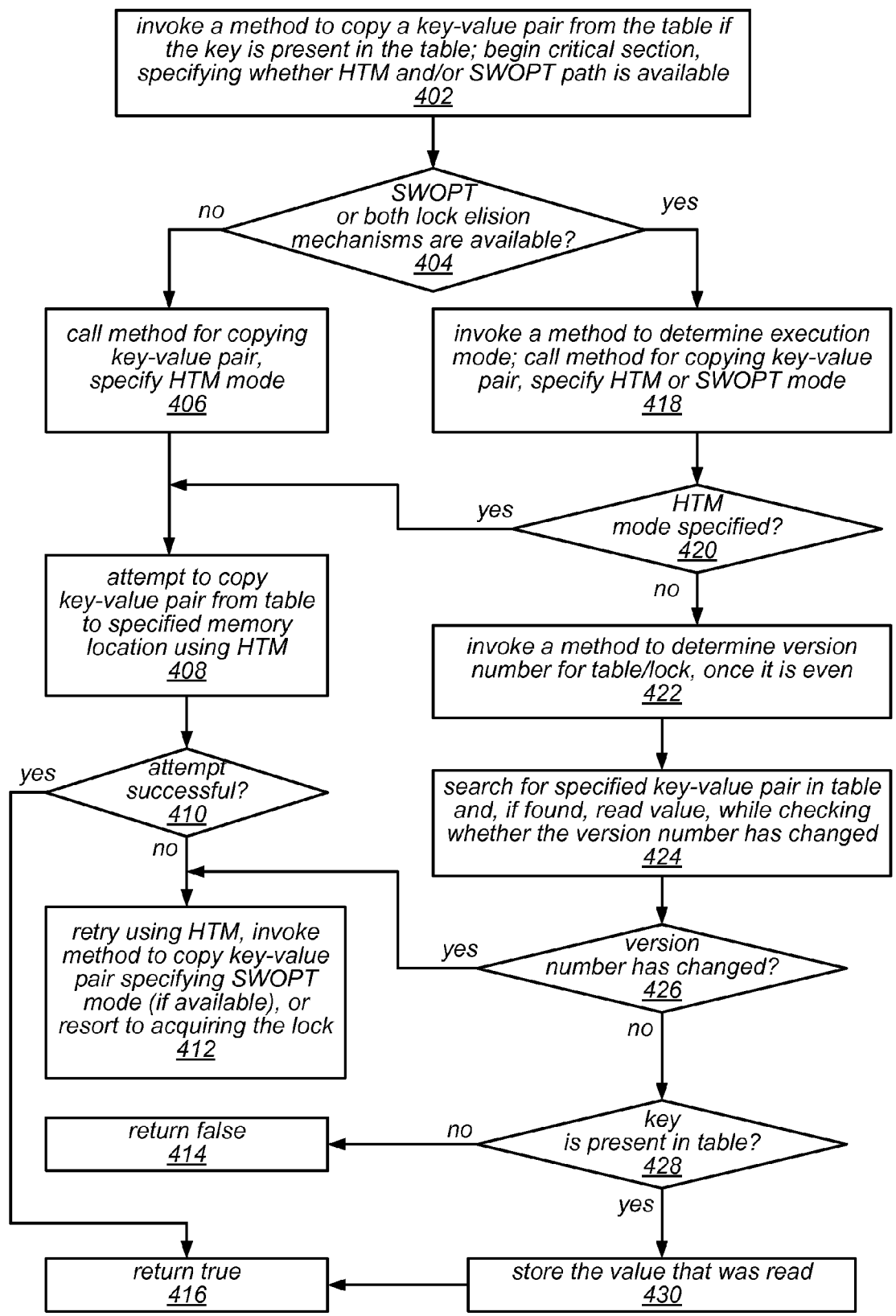

One embodiment of a method for integrating hardware transactional memory and a SWOPT path into the example HashMap described herein is illustrated by the flow diagrams in FIGS. 4A and 4B. More specifically, FIG. 4A illustrates an Insert method (such as that described above) that employs hardware transactional memory to execute a critical section of code containing two different operations that could potentially conflict with the actions of a corresponding Get method. For example, a conflict may arise when attempting to perform a Get operation optimistically (e.g., in SWOPT mode) while the Insert operation is in progress and is using hardware transactional memory. In this example, the code of the Insert method has been instrumented such that the Get method can determine (at runtime) whether its operations conflict with those of the Insert method using a mechanism similar to the sequence lock described above. As illustrated in FIG. 4A, in response to invoking a method to insert a new key-value pair into a table protected by a lock (as in 401), the method may include beginning execution of a single critical section using hardware transactional memory, and performing a search for the specified key in the table (as in 403).

In this example, if the specified key is not found (shown as the negative exit from 405), the method may include allocating and initializing a new node containing the new key-value pair (as in 407). The method may also include beginning a potentially conflicting action, which may include incrementing a version number associated with the table into which the new key-value pair is to be inserted and/or with a lock that protects accesses to the table (as in 409), and linking the new node into an appropriate list (as in 411). After adding and linking the new node, the method may include ending the potentially conflicting action, which may include incrementing the version number associated with the table and/or its lock (as in 413), and completing the execution of the critical section using hardware transactional memory (as in 415).

On the other hand, if the specified key is found in the table (shown as the positive exit from 405), the method may include beginning a different potentially conflicting action, which may include incrementing the version number associated with the table and/or its lock (as in 417), and copying the new value into the node for the specified key (as in 419). After copying the new value into the node, the method may include ending the potentially conflicting action, which may include incrementing the version number associated with the table and/or its lock (as in 421), and completing the execution of the critical section using hardware transactional memory (as in 415). Note that in some embodiments, a Remove method may execute using hardware transactional memory, and (if so) may also increment the version number twice.

FIG. 4B illustrates a copy operation that employs either hardware transactional memory or a SWOPT path to execute a critical section of code containing two different operations that could potentially conflict with the actions of a corresponding mutating operation. For example, a conflict may arise when attempting to perform the copy operation (which may employ a Get method, such as that described above, to search for and/or read a key-value pair in a table) optimistically (e.g., in SWOPT mode) while an Insert operation (or a Remove operation) is in progress and is using hardware transactional memory. In this example, it is assumed that at least one lock elision mechanism is available for the critical section (e.g., HTM or a SWOPT path) and that the system supports the integration of these two techniques (when available). It is also assumed that there is a preference to avoid having to acquire the lock associated with the table, but that the lock may be taken as a last resort if one or more attempts to execute the critical section using HTM or a SWOPT path are unsuccessful. As illustrated at 402, in this example, the method may be invoked in order to copy a key-value pair from the table if the key is present in the table, and may begin an attempt to execute a critical section, while specifying whether HTM and/or a SWOPT path is available. As illustrated in this example, if there is not a SWOPT path available (implying that only HTM is available, shown as the negative exit from 404), the method may include calling a method for copying the key-value pair, while specifying that this copy operation should be performed in HTM mode (as in 406), and attempting to copy the key-value pair from the table to a specified memory location using hardware transactional memory (as in 408).

If the attempt to copy the key-value pair from the table to the specified memory location using hardware transactional memory is successful (shown as the positive exit from 410), the method may include returning an indication of success to the caller of the copy function (e.g., a value of "true"), as in 416. However, if the attempt to copy the key-value pair from the table to the specified memory location using hardware transactional memory is not successful (shown as the negative exit from 410), the method may include retrying the attempt using hardware transactional memory, invoking a method to copy the key-value pair specifying that the attempt should be retried in SWOPT mode, or resorting to acquiring the lock for the table in order to perform the copy operation, according to an applicable retry limit and/or policy, as in 412. (Note that the details of such a retry attempt or lock acquisition are not shown in FIG. 4B).

As illustrated in this example, if a SWOPT path is available, or if both lock elision mechanisms are available (shown as the positive exit from 404), the method may include invoking a method to determine the execution mode to be employed in an attempt to copy the specified key-value pair from the table, and calling a method for copying key-value pair, specifying the determined execution mode (e.g., HTM mode or SWOPT mode), as in 418. If HTM mode is specified (shown as the positive exit from 420), the method may continue as in the case that only an HTM mode (and not a SWOPT mode) is available, beginning at element 408. However, if HTM mode is not specified (e.g., if it is determined that an alternative SWOPT path should be executed in the attempt to copy the specified key-value pair from the table or that HTM is not available, shown as the negative exit from 420), the method may include invoking a method to determine the version number associated with the table and/or its lock, once it is even (as in 422). For example, in some embodiments, the method may include waiting for the version number to be even before returning, indicating that there are not any potentially conflicting operations (e.g., the Insert method illustrated in 4A, a corresponding Remove method, or any mutating operation that conflicts with the copy operation) currently being executed in HTM mode, or that any such operations have been completed.

As illustrated in this example, if (or once) there are no potentially conflicting operations being executed in HTM mode, the method may include searching for the specified key-value pair in the table and, if found, reading value from the specified key-value pair (e.g., using a Get method, such as that described herein), while determining whether the version number has changed (as in 424). If the version number has changed since it was determined at element 422 (shown as the positive exit from 426), this indicates a validation failure. In other words, a result value of "false" may be generated by a validation check of the copy operation if the version number was incremented by another operation executing using hardware transactional memory (e.g., the Insert method illustrated in 4A, a corresponding Remove method, or any mutating operation that conflicts with the copy operation) since its value was determined at element 422. In the case of such a validation failure, which could be detected during the search or while reading, the result of the search (even if it returns "false", indicating that the specified key-value pair was not found) and the copied value (if the specified key-value pair was found) cannot be relied upon, as they may be incorrect due to inconsistent reads. In this case, the method may include retrying the attempt using hardware transactional memory, invoking a method to copy the key-value pair specifying that the attempt should be retried in SWOPT mode, or resorting to acquiring the lock for the table in order to perform the copy operation, according to an applicable retry limit and/or policy, as in 412. (Again note that the details of such a retry attempt or lock acquisition are not shown in FIG. 4B).

As illustrated in this example, if the version number has not changed since it was determined at element 422 (shown as the negative exit from 426) but the specified key is not present in table (shown as the negative exit from 428), the method may include returning an indication of a failure to locate the specified key-value pair (e.g., a value of "false") to the caller of the copy function, as in 414. In this case, the fact that the version number has not changed since it was determined at element 422 (shown as the negative exit from 426) may indicate that no potentially conflicting operation has been performed in the meantime. If the version number has not changed since it was determined at element 422 (shown as the negative exit from 426) and the specified key is present in table (shown as the positive exit from 428), the method may include storing the value that was read (as in 430), and returning an indication of success (e.g., a value of "true") to the caller of the copy operation, as in 416.

As described above, using a SWOPT path for a Get operation may typically be effective because a Get operation never modifies any shared data and therefore never causes a conflict for concurrent operations. Some operations cause conflicts in some cases, but not in others. For example, the Remove method described above may cause conflicts only if the specified key is not in the hash table. This suggests that, in some embodiments, it might sometimes be profitable to allow a critical section to be executed in SWOPT mode only in some cases, as determined at runtime. Example methods for achieving this are described below, according to different embodiments.

In some embodiments, if the non-conflicting case is expected to be common, then the "self-abort" idiom may be used to execute in SWOPT mode until and unless a potentially conflicting case arises (e.g., until a conflicting region is encountered). In that case, the critical section may be retried, this time indicating that a SWOPT path is not available (or that it should not be used), so that in the subsequent attempt, a non-optimistic option will be chosen. Relying on a self-abort may be relatively simple and convenient, but may provide less benefit when conflicting operations become more common. This case is described next.

As previously noted, while searching for the specified key, Insert and Remove perform no actions that would interfere with SWOPT paths. Therefore, a SWOPT path may be provided for the first parts of these methods, as well. Note however, that when these methods perform an action that interferes with other SWOPT executions, those actions cannot be done in SWOPT mode. In some embodiments, a nested critical section that has no SWOPT paths may be used to perform such actions.

To achieve this, in a manner similar to the optimistic Get method discussed above, a BEGIN_CS_EXTENDED macro may be used to begin the critical section, while indicating that it has a SWOPT path, and (when executed in this mode) the version number may be used to detect any potential conflicts that arise during the search. If no conflict occurs during the search, a conflicting action is likely to be performed by the latter portions of these methods, in most cases, as described above. These conflicting actions may have side effects that affect concurrent operations, and therefore cannot be performed in SWOPT mode. In some embodiments, the conflicting code section may instead be protected by the lock, in this case.

In some embodiments, this may be achieved via a short critical section that is introduced using the BEGIN_CS macro or one of its variants that indicates that a SWOPT path is not available. Some care may be required due to the possibility of the SWOPT execution being invalidated before or during the lock acquisition by the nested critical section (or before it is read in the case of TLE). Therefore, in some embodiments, after acquiring the lock or beginning the hardware transaction, the nested critical section may first determine whether a conflict has occurred (e.g., by again validating the current version number). If a conflict is detected, the shorter critical section may be ended without performing the conflicting action, and the entire operation may be retried (after reporting the SWOPT failure to the library).

Note that, while additional code can be executed in the outer SWOPT critical section after the short critical section is completed, in general code that might be invalidated by concurrent operations should be avoided. This is because the short critical section has already been executed and its effects may have been observed by other processes or threads. Therefore, retrying in SWOPT mode after this point is generally undesirable.

Note that the above-described technique to allow non-conflicting parts of larger critical sections to be executed in SWOPT mode introduces nesting (or more specifically, a type of nesting in which a short critical section containing a conflicting region is nested within a larger critical section). In some embodiments, the ALE library may provide limited nesting support for this purpose, as described below.

Statistics and Profiling Information

In various embodiments, the ALE libraries described herein may collect various statistics and profiling information about ALE-enabled locks and critical sections. This may include how often each ALE-enabled critical section was executed, how many times each method (TLE, SWOPT, or acquiring the lock) was attempted and/or was successful, how much time was spent using each method, etc. Techniques for efficiently recording this information are described later.

The information collected by the library may be useful for several reasons. For example, collecting this information may provide input for adaptive policies that make effective choices about which methods to try and when, taking into account dynamic information about application behavior for the current workload and platform.

In some embodiments, the ALE library may produce a report that summarizes the collected information for each ALE-enabled lock, and may break this information out for each ALE-enabled critical section associated with the lock. Such a report may be helpful in improving ALE by experimenting with different policies, different workloads, and different granularities at which statistics are collected (e.g., via the use of different contexts), as described below. It may also be useful in its own right to identify the most frequently accessed locks and/or critical sections. For example, by enabling critical sections to use the ALE library (even with the TLE mode disabled and with no optimistic alternatives implemented, or when not using TLE nor SWOPT, if available), the resulting report may be used to identify promising candidates for which an optimistic alternative may be added.

Using the Same Critical Section in Different Contexts

As previously noted, the statistics collected by the ALE library may be used to analyze the behavior of an application and/or to guide the behavior of adaptive lock elision policies. Note that in some embodiments, the ALE library may provide the programmer with the option to choose the granularity at which decisions are being made, which may include specifying the granularity of the statistics that are being collected. Note also that different executions of a given source-level critical section may use different locks, and may be executed in different "contexts" (as described below). In some cases, these factors may affect the best choice of execution mode for the critical section. Therefore, in some embodiments, the ALE library may collect information on a per-lock and/or per-critical section basis. For example, the library may collect statistics and profiling information at the granularity of <lock, context> pairs.

In general, each critical section integrated with the ALE library (e.g., using a library macro such as BEGIN_CS) defines a scope. As noted above, the ALE library may provide the programmer with the option to choose the granularity at which decisions about execution modes are being made. In some embodiments, this may include providing a mechanism for making decisions about whether to execute a critical section (or a portion of a critical section) in a Lock mode, an HTM mode, or a SWOPT mode in a scope other than that of the critical section as a whole. In other words, rather than a thread's context always being determined by the ALE-enabled critical sections within which it is executing, programmers may explicitly create additional scopes within their code, allowing the library to collect and/or apply statistics and profiling information at even finer granularity.

The ability to create or define additional scopes or contexts with ALE-enabled critical sections for which execution mode decisions are made may be especially important when moving from one application or benchmark to another. For example, a programmer who is familiar with the benchmark or application may wish to make the execution mode decision for one execution path differently than the way the execution mode decision is made for another execution path, and may separate the two paths into two different contexts. In some embodiments, the programmer may be able to specify, in the code, that a particular portion of the code (e.g., on one path) is one context and that another portion of the code (e.g., on another path) is in another context (e.g., by defining different scopes at each path). This may lead to better execution mode choices and better overall performance for the benchmark or application based on the programmer's knowledge of the code.

In some embodiments, if the programmer knows that there are two or more different behaviors for the same critical section code, and the programmer can predict the behavior based on a condition that can be tested in the code (e.g., based on the value of a particular variable), the programmer may separate those cases and make execution mode decisions for those cases differently (e.g., using collected profiling information that is specific to those cases and/or using different heuristics when determining the best execution modes at runtime). For example, if the programmer knows that when the value of a particular variable is zero, execution in SWOPT mode is very likely to succeed, but when the value of that variable is one, it is almost impossible for execution in SWOPT mode to succeed, the programmer may be able to express this in the code. In this example, even if the library cannot determine this bias with a single set of statistics for all executions of the critical section, the programmer may be able to express that the statistics for the critical section should be collected separately (and in some cases differently) for each case depending on the value of that variable, and execution mode decisions for that critical section may be made differently because the statistics were separated.

An example of the use of this ability to explicitly create additional scopes is described below. This example uses the C++ "scoped locking" idiom. A scoped lock is a class that encapsulates a lock whose constructor and destructor are responsible for acquiring and releasing the lock, respectively. Enabling critical sections introduced in this way for ALE may involve the use of the BEGIN_CS and END_CS macros (or variants thereof) within the constructor and destructor. Thus, regardless of the context in which the scoped lock is declared, there may only be a single critical section at the source level. This may imply a single set of statistics for all acquisitions of each lock used this way, and thus no ability for policies to specialize behavior for (effectively) different critical sections. In other words, without modification, a scoped lock has only a single scope and (effectively) a single context.

This problem may be addressed by extending the library to allow the programmer to explicitly declare additional scopes (thus identifying new contexts), and by providing variants of the BEGIN_CS macro that execute the critical section within the current context (the one most recently begun but not yet ended).

As previously noted, each critical section integrated with the ALE library using the library macro BEGIN_CS defines a scope. In some embodiments, a thread's context may be represented as an initially-empty sequence of scopes. When a thread begins execution of a critical section, its scope may be added to the thread's context. When the critical section is completed, the scope may be removed from the thread's context. In the case of scoped locking, this may be implemented as in the following example pseudocode:

```
1    void foo( ) {
2        ...
3        BEGIN_SCOPE("foo.CS1");
4        {
5            ScopedLock(&myLock);
6            // CS body
7        }
8        END SCOPE( );
9    }
```

In this example, the BEGIN_SCOPE macro introduces a new scope having the label "foo.CS1", and the constructor of ScopedLock uses a variant of the BEGIN_CS macro that uses the current context. The result is that the critical section that begins in the constructor of ScopedLock will execute in different contexts depending on where the constructor is called from, allowing the library to distinguish the different cases. Note that a context may be thought of as consisting of a chain of scopes. In the example pseudocode above, a scope is added before beginning the critical section, which therefore affects the context (implying a context with a different context identifier). The additional scope that is based on the call to BEGIN_CS may be added or removed, in which case the context will be the concatenation of that scope with the external scope implied by the BEGIN_SCOPE/END_SCOPE pair. As illustrated in this example, different instantiations of the scoped lock in different scopes may lead to different contexts, and thus different statistics.

In some embodiments, statistics may be maintained per context, rather than (or in addition to) per critical section. In such embodiments, even though the scoped lock has only a single critical section at the source level, statistics may be associated with the context within which the constructor is called, so that policies can collect and use separate statistics per context. For example, for a given <lock, context> pair, the library may record statistics such as: how often a critical section was executed using this lock in this particular context; how many times each method (TLE, optimistic SWOPT, or acquiring the lock) was attempted and/or was successful; how much time was spent using each method, and/or other information about the execution of the critical section in this particular context.

Another way to use different contexts for the same critical section allows for cases in which a programmer expects that different decisions may be best for different cases, as in the following example pseudocode:

```
1    if (<condition>)
2        BEGIN_CS_NAMED(&MyLockAPI, &tblLock,
3            md_tblLock, "condition is true")
4    else
5        BEGIN_CS_NAMED(&MyLockAPI, &tblLock,
6            md_tblLock, "condition is false")
7    {
8        <CS body>
9    }
10       END_CS(&MyLockAPI, &tblLock, md_tblLock)
```

In this example, the code creates a separate context (and thus collects separate statistics) for the two calls to BEGIN_CS_NAMED. In other words, the execution of this code results in associating a different scope, and thus a separate context and statistics, with each call to BEGIN_CS_NAMED, allowing the library to adapt differently depending on whether the condition holds. In some embodiments, the descriptive labels provided to the BEGIN_CS_NAMED macro describe the scope, and may be used by the library when generating reports, to improve the readability of the reports, as compared to reports generated using default labels based on file names and line numbers.

Library Implementation

In some embodiments, the ALE library separates common, policy-independent functionality from the functionality of one or more separate pluggable policies. The ALE macros described in the previous section (which may also be invoked through the ALE library's API) may be expanded to call policy-independent code, and to communicate with the policy via an interface that each policy implements. In general, each policy may define the metadata that is associated with each lock and each context, and may provide methods for managing this metadata, as well as for deciding which mode to use when executing critical sections. The basic functionality of the library is described below, followed by an illustration of an example approach to nesting. Several example policies are also described below, including a static one based on fixed parameters, and adaptive ones that choose execution modes and retry parameters based on observed runtime behavior.

In various embodiments, with assistance from the policy as described below, the policy-independent code may have one or more of the following responsibilities:

Maintaining metadata for locks, <lock, context> pairs, and associations between locks, contexts and their respective metadata.

Notifying the policy of various events (as described below).

Selecting or determining critical sections' execution modes.

Executing appropriate code to begin and end critical sections, based on the selected mode.

Recording and managing threads' contexts (e.g., sequences of scopes) and ensuring correct nesting semantics.

In some embodiments, and under certain circumstances, the library may call the policy (e.g., via the policy interface) for assistance with these responsibilities. For example, each ALE-enabled lock has associated metadata, and each ALE-enabled critical section has metadata that identifies its associated scope. Each is allocated and initialized once. For example, the first time a context is used, the library may call policy-provided functions to allocate and initialize the policy-specific metadata (called a "granule") for that <lock, context> pair, and record it for efficient subsequent lookup. More specifically, when execution of a critical section is attempted for the first time by any thread in a given context with a given lock, the library may associate the policy-specific metadata with the context by defining a static variable at the first line of the context, and making it point to the newly allocated context metadata.

In some embodiments, the library may call policy-specific functions to notify the policy of various events, such as beginning or ending a critical section, or failing an attempt to execute a critical section using hardware transactional memory or a SWOPT path, providing input to guide the policy's decisions. This may allow the policy to record information to help guide its decisions about the mode in which a critical section should be executed.

As noted above, in some embodiments, each time execution of a critical section is attempted, the library may determine the mode in which it should be executed (e.g., HTM mode, SWOPT mode, or Lock mode), and may execute appropriate critical section preamble code accordingly. For example, before beginning a critical section, the library may call a policy-specific function that determines whether the critical section should be executed with the lock held, using TLE (exploiting available HTM), or using a SWOPT path. The policy may use the metadata associated with the current lock and/or context to guide its decision. In some cases, however, the library instead may determine the mode based on the mode of the enclosing critical section in order to ensure correct nesting semantics, as described below.

In some embodiments, having determined the mode in which a critical section will be executed, the library may execute appropriate preamble code to begin executing the critical section in the determined mode. For example, in the case that the decision is that the critical section is to be executed in Lock mode, the preamble code may acquire the lock. For execution in HTM mode, the preamble code may begin a hardware transaction, and then check that the lock associated with the critical section is not held (e.g., using the is_locked function provided by the lock's API). In this mode, executing the preamble code may include aborting the transaction and retrying (possibly in a different mode) if the lock is held, and returning to user code to execute the critical section otherwise. For execution in SWOPT mode, the library may return to user code without accessing the lock. In all of these cases, the library may record the execution mode, allowing user code to determine whether it is executing in SWOPT mode, as described herein, thus supporting implementation of the GET_EXEC_MODE macro described herein.

As noted above, in some embodiments, the policy may provide assistance for many of these responsibilities. For example, the policy may define the structure of metadata for locks and granules, and may provide methods for allocating and initializing them and for updating them in response to various events reported by the library, such as beginning or ending a critical section, or failing an attempt to execute a critical section in HTM or SWOPT mode. As previously noted, the library may also consult the policy to choose a mode for each critical section execution attempt. In some embodiments and/or in some cases, the library may constrain the available mode choices in order to maintain correct nesting semantics, as discussed below. The policy may base its decisions on information recorded in the relevant granule about the previous behavior of critical sections using the same lock(s) in the same context(s).

Figure 5:
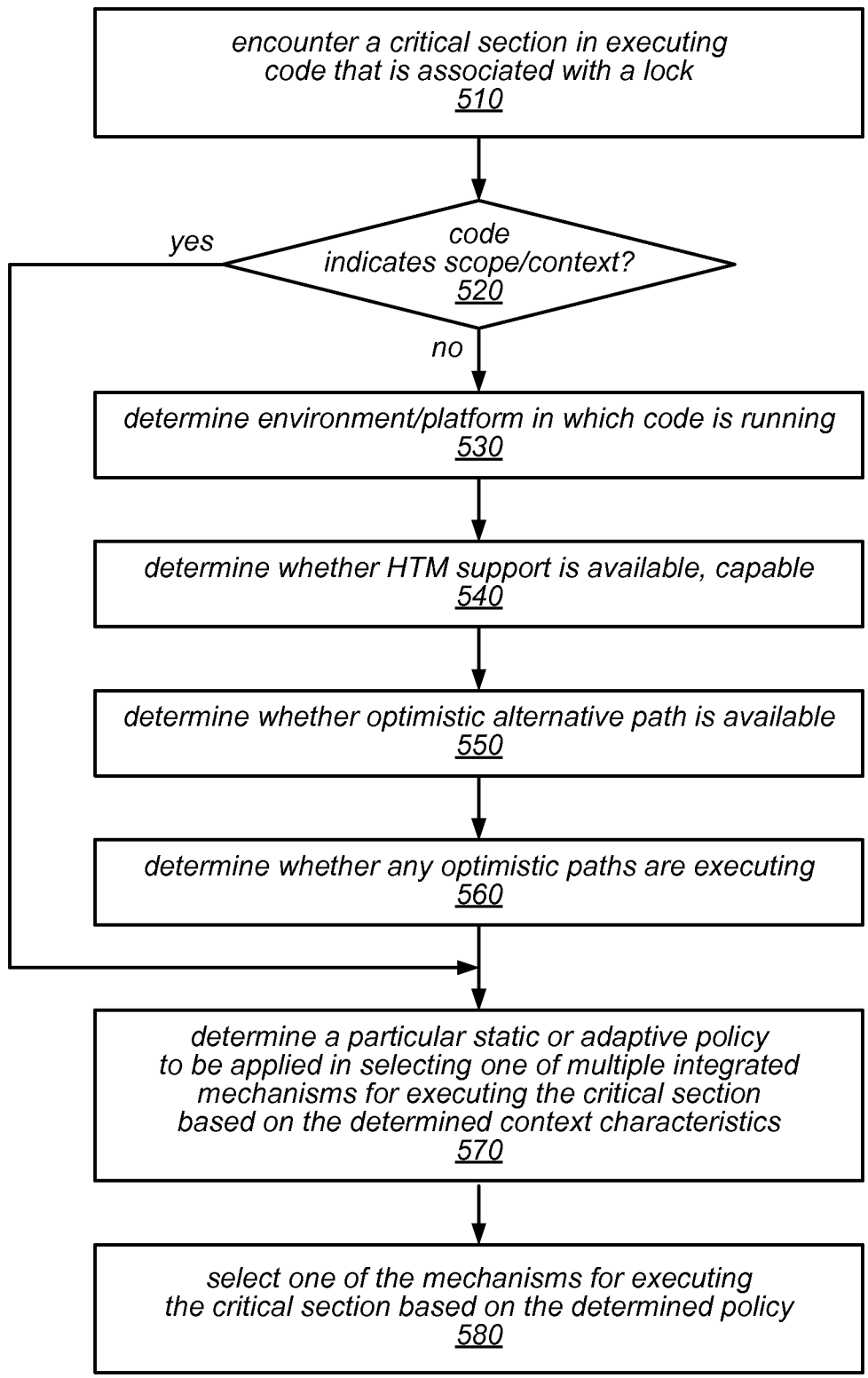
FIG. 5 is a flow diagram illustrating one embodiment of a method for determining the context in which a critical section is encountered, as described herein.

One embodiment of a method for determining the context in which a critical section is encountered is illustrated by the flow diagram in FIG. 5. Note that in various embodiments, this determination may be performed automatically or semi-automatically (e.g., with some programmer intervention to define contexts). As illustrated at 510, in this example, the method may include encountering a critical section in executing code that is associated with a lock. If the code itself includes any indication of the current context (e.g., through the use of instrumentation or any other explicit or conditional indication of scope or context), shown as the positive exit from 520, the method may include determining a particular one of several static and/or adaptive policies to be applied in selecting one of multiple integrated mechanisms for executing the critical section based on the determined context characteristics (as in 570). For example, in some embodiments, the programmer of the executing application may have included an explicit or conditional indication of the context that is sufficient for use in determining a policy for selecting a mode in which to execute the critical section (e.g., an indication of whether HTM support and/or a SWOPT path is available, or a condition under which a SWOPT path should be executed). The method may also include selecting one of the available mechanisms for executing the critical section, based on the determined policy, as in 580.

If the code does not indicate the current context (shown as negative exit from 520), i.e., absent any explicit or conditional indication of context in the code, the method may include determining the context based on one or more other factors, such as any of the context characteristics described herein and/or other context characteristics. In some embodiments, the method may include determining the environment/platform in which code is running (as in 530) and/or determining whether HTM support is available and capable of executing the critical section (as in 540). For example, if HTM support is available, and if is it suitable for execution of the code in the critical section, it may be used to execute the critical section using TLE. Note, however, that some instructions or code sequences (e.g., those involving input/output operations) are not suitable for execution using HTM (e.g., because they cannot be rolled back in the case of a failure). Similarly, the method may include determining whether an optimistic alternative path (a SWOPT path) is available for executing the critical section (as in 550). In some embodiments, the method may include determining whether any optimistic alternative paths are currently executing (as in 560). For example, the method may include determining whether an optimistic alternative code path is currently being used to execute another critical section that is protected by same lock.

As illustrated in this example, after determining the context in which the critical section was encountered and/or various characteristics thereof, the method may include determining a particular static or adaptive policy to be applied in selecting one of multiple integrated synchronization mechanisms (which may include multiple integrated lock elision mechanisms) for executing the critical section based on the determined context characteristics (as in 570). The method may also include selecting one of the mechanisms (e.g., Lock mode, HTM mode, or SWOPT mode) for executing the critical section based on the determined policy (as in 580).

Nesting

As previously noted, in some embodiments, nesting may be used to improve performance by minimizing the part of the critical section that must be protected by the lock. In some embodiments, the ability to nest ALE-enabled critical sections may be useful in that it is likely to arise as a natural consequence of modularity, especially in applications that use fine-grained locking. In various embodiments, different combinations of nested critical sections may be supported for this purpose, as described below.

Some embodiments may require ALE-enabled acquisition-release pairs to be properly nested. In such embodiments, when a lock is released at the end of or within an ALE-enabled critical section, it must be the most recently acquired lock that has not since been released, otherwise, a runtime error may be reported. In some cases, this requirement may be an outcome of a design choice, whereby per-thread stacks of frames are used to record information associated with the critical section executed at each nesting level, including the lock accessed and its associated metadata, the relevant granule, and information about the current mode and execution attempt. In some embodiments, each process or thread may maintain a stack that holds references to the metadata associated with the critical section executed at each nesting level. For example, for each critical section execution, a frame may be pushed onto the thread's stack before the first execution attempt, and this frame may be removed after successful completion.

In some embodiments, BEGIN_CONTEXT* macros and/or BEGIN_CS* macros (except BEGIN_CS_IN_EXIS- TING_CONTEXT) may typically push a record identifying the context onto the stack, initialized to identify the appropriate context and lock metadata. Similarly, the END_CONTEXT* and/or END_CS* macros may remove the topmost stack frame. In other embodiments, the BEGIN_CS* and END_CS* macros may handle the pushing and popping, if necessary, and the BEGIN_SCOPE and END_SCOPE macros described above may help determine the context (otherwise the context may be a single scope determined by the location of the BEGIN_CS* macro). Note that, in some embodiments (for reasons explained later), a new frame may not be pushed onto the stack when these macros are called within a critical section that is being executed using hardware transactional memory, i.e., for a critical section that is nested within another critical section that is executing in HTM mode.

In some embodiments, when a critical section is subsequently started within the current context, the record on the top of the stack may be updated to identify the specified lock. Recall that the BEGIN_CS macro described herein may implicitly define a new context. Thus it may combine the steps of adding a record to the stack and associating it with the lock.

In some embodiments, the library may then determine the mode in which execution of the critical section will be attempted. This decision may be affected by the availability of HTM and/or a SWOPT path, and/or by the decision made by the policy. In some embodiments, the library may also consider whether the critical section is nested within another ALE-enabled critical section, and if so, the mode in which the enclosing critical section is running.

Based on which nesting cases are believed likely to be most common and beneficial, pragmatic choices may be made about which cases to support and which cases are difficult to support or are likely to impose significant overhead. For example, if a critical section is not nested within another ALE-enabled critical section, then the eligible modes for executing the critical section may be determined by the availability of HTM and/or of a SWOPT path (unless the programmer explicitly prohibits one or both). For a nested critical section attempt, the library may further restrict the choice of modes, in some cases.

In some embodiments, if a critical section (nested or not) is executed using hardware transactional memory, all critical sections nested within it may also be executed using the same hardware transaction, while checking that their associated locks are not held. In such embodiments, if a macro that begins such a nested critical section indicates that HTM should not be used for that critical section, the hardware transaction may be aborted. This is because committing a transaction for an enclosing critical section in order to begin a nested critical section in another mode would likely violate the atomicity of the enclosing critical section. In this case, no contexts are pushed onto the stack for such nested critical sections, and the library may not notify the policy of events related to them. In other words, a frame may be pushed onto the stack only for the outermost critical section executed in HTM mode. In some embodiments, this approach may minimize the duration of the transaction, as well as reduce the amount of data written within the transaction.

As described above, a critical section may be nested within another critical section associated with the same lock. (This may require a reentrant lock to be used, in some embodiments.) In this case, if the enclosing critical section has acquired the lock, and the library decides to execute the nested critical section using a hardware transaction, the hardware transaction may abort unnecessarily (e.g., because it will see that the lock is held). This may not affect correctness, but may impact performance by causing the nested critical section to be retried. To avoid this, at least in case in which the nested critical section is associated with the same lock as the immediately enclosing critical section, the library may avoid the abort by observing that the lock is already held by this process or thread, and may therefore elide the check to ensure that the lock is not held by another process or thread.

In some embodiments, the library will never choose to execute a nested critical section using its SWOPT path if the lock associated with the critical section is already held by the same process or thread due to an enclosing critical section protected by the same lock. In other words, if a thread already holds the lock accessed by a nested critical section, a SWOPT path may not be used even if one is available. This is because there may be no benefit to doing so, and allowing this case may complicate the library. In this case, HTM mode may be chosen. However, to avoid an unnecessary abort, the library may not check whether the lock is held, in this case.

In some embodiments, SWOPT mode may not be eligible if the thread is already executing in SWOPT mode for an enclosing critical section associated with a different lock. This may not imply that programmers cannot nest SWOPT-capable critical sections (e.g., nesting critical sections with SWOPT paths within others), but only that, in some embodiments, the library may not choose SWOPT mode for the nested critical section in this case. In such embodiments, the library may execute a nested critical section using either HTM or by acquiring the lock, if it is executing an enclosing critical section (associated with a different lock) in SWOPT mode. In other words, in some embodiments, the library may choose to execute a nested critical section in SWOPT mode only if it is not already in SWOPT mode, or if it is in SWOPT mode but the enclosing SWOPT path is associated with the same lock as the nested one.

The following table (Table 1) summarizes the methods that a policy may be allowed to choose, in one embodiment, for execution of a nested critical associated with a lock L, as a function of the execution methods allowed by the nested critical section (CS), and the execution methods chosen for critical section(s) in which it is nested. In this example, the conditions on the left column are not mutually exclusive, but they are evaluated in the order they are presented (from top to bottom). Thus, if a condition at a certain row holds, the rules specified at that row are in effect, regardless of whether or not the conditions on lower rows also hold.

TABLE 1

| | Allowed methods in a nested CS associated with lock L | | | |
|---|---|---|---|---|
| Status of external CS execution | HTM & SWOPT & Lock | HTM & Lock | SWOPT & Lock | Lock only |
| An external CS is executed using | Execute the nested CS using HTM (using the same | | Abort the hardware transaction that is | |

TABLE 1-continued

Allowed methods in a nested CS associated with lock L

| Status of external CS execution | HTM & SWOPT & Lock | HTM & Lock | SWOPT & Lock | Lock only |
|---|---|---|---|---|
| HTM (i.e., the thread is currently executing inside a hardware transaction) | hardware transaction that executes the external CS). Abort the hardware transaction if L is held by another thread. | | executing the external CS | |
| An external CS that is associated with L is executed using the lock (i.e., the thread is currently holding L). | Execute the nested CS by either HTM or by acquiring L (i.e., avoid using SWOPT even if it is allowed). If using HTM, avoid aborting the hardware transaction due to the lock being held (because it is being held by the same thread). If acquiring the lock, note that L must support reentrance (programmer responsibility). | | Execute the nested CS by acquiring L (i.e., avoid using SWOPT mode even if it is allowed). Note that L must support reentrance (programmer responsibility). | |
| An external CS that is associated with a lock L2 different than L is executed using SWOPT | Execute the nested CS using any of the allowed methods except for SWOPT mode | | | |
| All other cases | Execute the nested CS using any one of the allowed methods. | | | |

Figure 6:
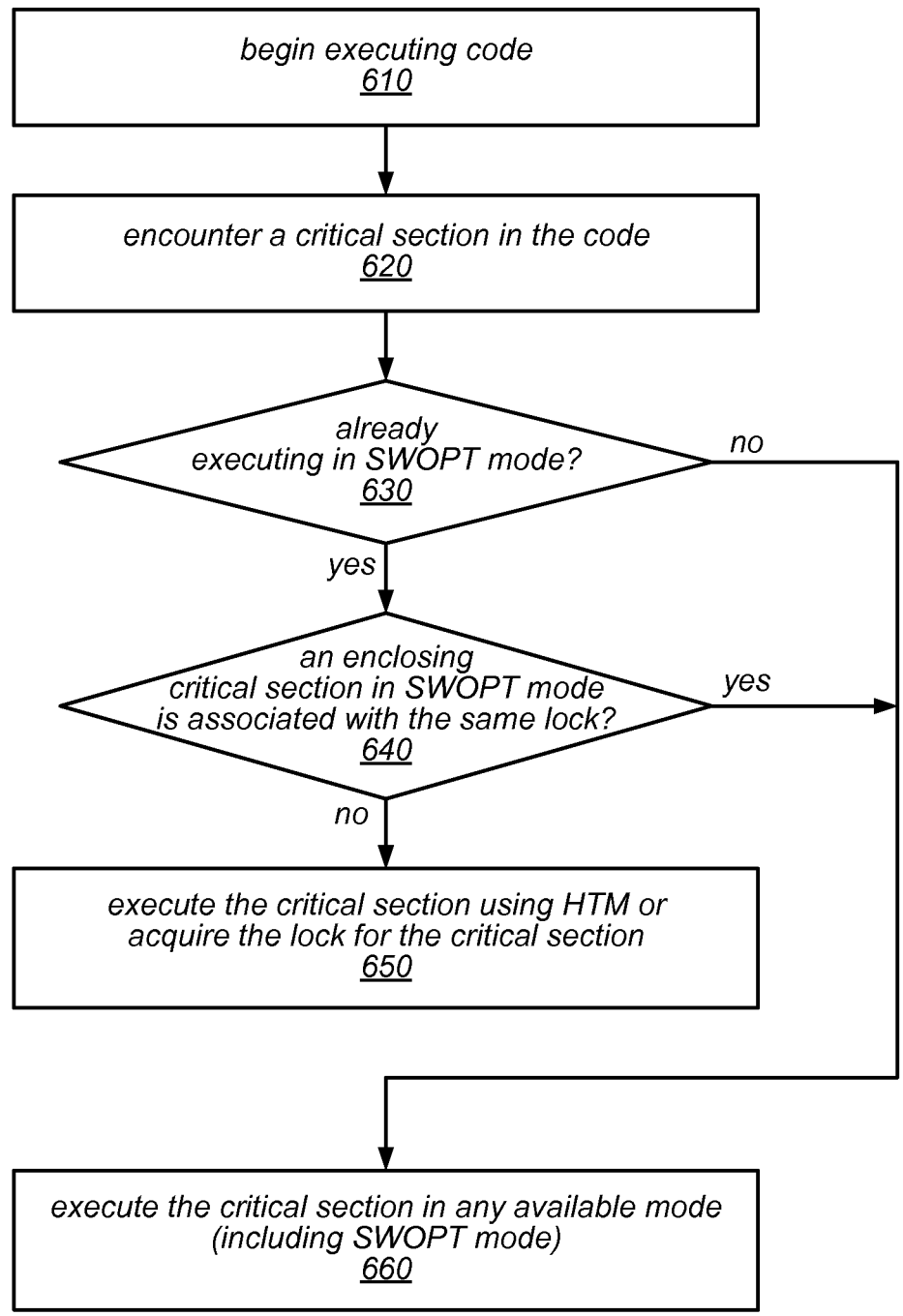
FIG. 6 is a flow diagram illustrating one embodiment of a method for implementing adaptive lock elision for executing critical sections that may be nested, as described herein.

One embodiment of a method for implementing adaptive lock elision for executing critical sections that may be nested is illustrated by the flow diagram in FIG. 6. As illustrated at 610, in this example, the method may include a process or thread beginning execution of code and encountering a critical section in the code (e.g., one that is associated with a lock), as in 620. If the process or thread is not already executing in SWOPT mode (but a SWOPT path is available for the critical section), the method may include executing the newly encountered critical section optimistically (e.g., in SWOPT mode) or using another available mode (e.g., Lock mode or HTM mode). Similarly, if the process or thread is not already executing in SWOPT mode because a SWOPT path is not available for the critical section, the method may include executing the newly encountered critical section using another available mode (e.g., Lock mode or HTM mode). This is illustrated in FIG. 6 by the path from the negative exit of 630 to 660. Note that the execution of the critical section in SWOPT mode may succeed or may fail, after which it may be retried in SWOPT mode or in a different execution mode (not shown).

Similarly, if the process or thread is already executing optimistically (e.g., if an enclosing critical section is executing in SWOPT mode) and the enclosing critical section is associated with the same lock as the one associated with the newly encountered critical section, the method may include executing the newly encountered critical section optimistically (e.g., in SWOPT mode) or in another available mode. This is illustrated in FIG. 6 by the path from the positive exit of 630 to 640 and from the positive exit of 640 to 660. Again, the execution of the critical section in SWOPT mode may succeed or may fail, after which it may be retried in SWOPT mode or in a different execution mode (not shown). Otherwise (e.g., if the thread was already executing in SWOPT mode, but the enclosing critical section is associated with a different lock), the method may include executing the critical section using hardware transactional memory or by acquiring the lock for the critical section (as in 650). In other words, in this case, the critical section may be executed using any available mode except SWOPT mode. Here again, the execution of the critical section may succeed or may fail, after which it may be retried in the same execution mode or in a different execution mode (not shown).

As illustrated in this example, in some embodiments the library may choose to execute a critical section optimistically only if it is not already executing optimistically, or if it is executing optimistically but the enclosing optimistic critical section is associated with the same lock as the nested one.
Grouping As described herein, a SWOPT path for a critical section may only execute successfully as long as no other process or thread is holding the lock associated with the critical section and as long as no other process or thread performs a conflicting operation. However, once a concurrent process or thread acquires the lock, performs a mutating operation, and releases the lock, the SWOPT execution may fail (e.g., in response to determining that the version number for the lock has changed). In some cases, it may be possible to get into a situation in which there is a type of starvation, leading to a cascading effect. For example, there may be one SWOPT execution that keeps retrying (and failing) while other processes or threads are waiting to acquire the lock. In this case, all of the threads attempting to execute the critical section (in various execution modes) may fall from one option to the next option (e.g., from SWOPT mode to HTM mode and/or from HTM mode to Lock mode) because the processes or thread executing using the next option cause them to fail. In some embodiments, this cascading effect may be prevented or avoided by allowing some executions to be performed in parallel without significantly delaying the processes or thread that wish to acquire the lock.

For example, in some embodiments in which both HTM support and SWOPT paths are available, multiple processes or threads that wish to execute a critical section in HTM mode may be able to run in parallel as long as no SWOPT paths associated with the same lock(s) are running. In some such embodiments, the library may be configured to delay the execution of SWOPT paths in order to allow some or all of the HTM mode executions to run (in parallel). After allowing multiple HTM mode executions to run, the library may be configured to allow some or all of the SWOPT paths to execute (in parallel), after which multiple processes or threads that wish to acquire the lock(s) may be allowed to run (one at a time). In some embodiments, the library may be configured to create groups of processes or threads that would like to run in a particular mode, and to execute them in parallel with each other, while briefly holding off any other executions that might cause them to fail (e.g., due to a conflict caused by accessing a critical section or resource protected by the same lock). Note that in some embodiments, only the execution of processes or threads that are attempting to acquire a particular lock (a lock that is being elided using another execution technique) may be delayed while a group of non-conflicting HTM executions and/or SWOPT paths are being allowed to run in parallel. In other words, in some embodiments, performance improvements due to parallelism may be achieved by grouping together processes or threads that wish to run in a mode in which multiple such processes or threads can execute in parallel (e.g., using the same lock elision technique or using different techniques to execute critical sections that cannot cause a conflict with any other processes or threads in the group), and allowing all of the processes or threads in the group to run before allowing other processes or threads (e.g., processes or threads that are using a different technique and/or processes or threads that could cause one of the members of the group to fail) to run. One example of such a grouping mechanism is described below.

Recall that in some embodiments, a SWOPT path can be caused to retry only if a critical section protected by the same lock executes a conflicting region (implying that the latter is executed either using TLE, i.e., in HTM mode, or in Lock mode, i.e., with the lock held). Thus, if such critical section executions for that lock are temporarily prevented from executing, then all SWOPT paths for critical sections associated with the same lock can execute in parallel without interference (i.e., without encountering conflicts). In some embodiments, a concurrency control technique may be employed that attempts to group concurrent executions of SWOPT paths associated with the same lock together. This grouping mechanism may attempt to run executions of SWOPT paths associated with the same lock concurrently, while delaying the execution of critical sections that might conflict with them.

In some embodiments (and for most cases), this approach may be sufficient to guarantee that any critical section for which a SWOPT path is available can always complete without acquiring the lock. However, this may not be guaranteed in some complex nesting cases (e.g., in some cases involving the nesting of critical sections that are associated with multiple different locks). Therefore, in some embodiments, SWOPT paths may still be attempted a pre-determined maximum (bounded) number of times, ensuring that (rare) livelock scenarios do not persist indefinitely.

In some embodiments, the grouping mechanism may use a scalable non-zero indicator (SNZI) to track whether any threads executing SWOPT are retrying. If so, executions that potentially conflict with those SWOPT executions may wait for the SNZI to indicate that all such SWOPT executions have completed. For example, a process or thread that fails its first SWOPT trial may arrive at a per-lock SNZI before retying that path, indicating to potentially-conflicting critical sections that they should wait until all SWOPT executions associated with that lock have completed (as indicated by departing from the SNZI). Executions that potentially conflict with concurrent SWOPT executions may check the SNZI to determine if any SWOPT executions have arrived at the SNZI, and if so, may wait for the SNZI to indicate that all such SWOPT executions have departed. In some embodiments, concurrency may be increased by respecting the SNZI probabilistically (i.e., with some probability), because potentially-conflicting critical sections can continue executing after a SWOPT path arrives at the SNZI, but will eventually defer to this SWOPT execution and any others that may have started retrying in the meantime. In some embodiments, the grouping mechanisms described herein may significantly improve performance, in certain cases, e.g., when SWOPT executions retry multiple times.

Figure 7A:
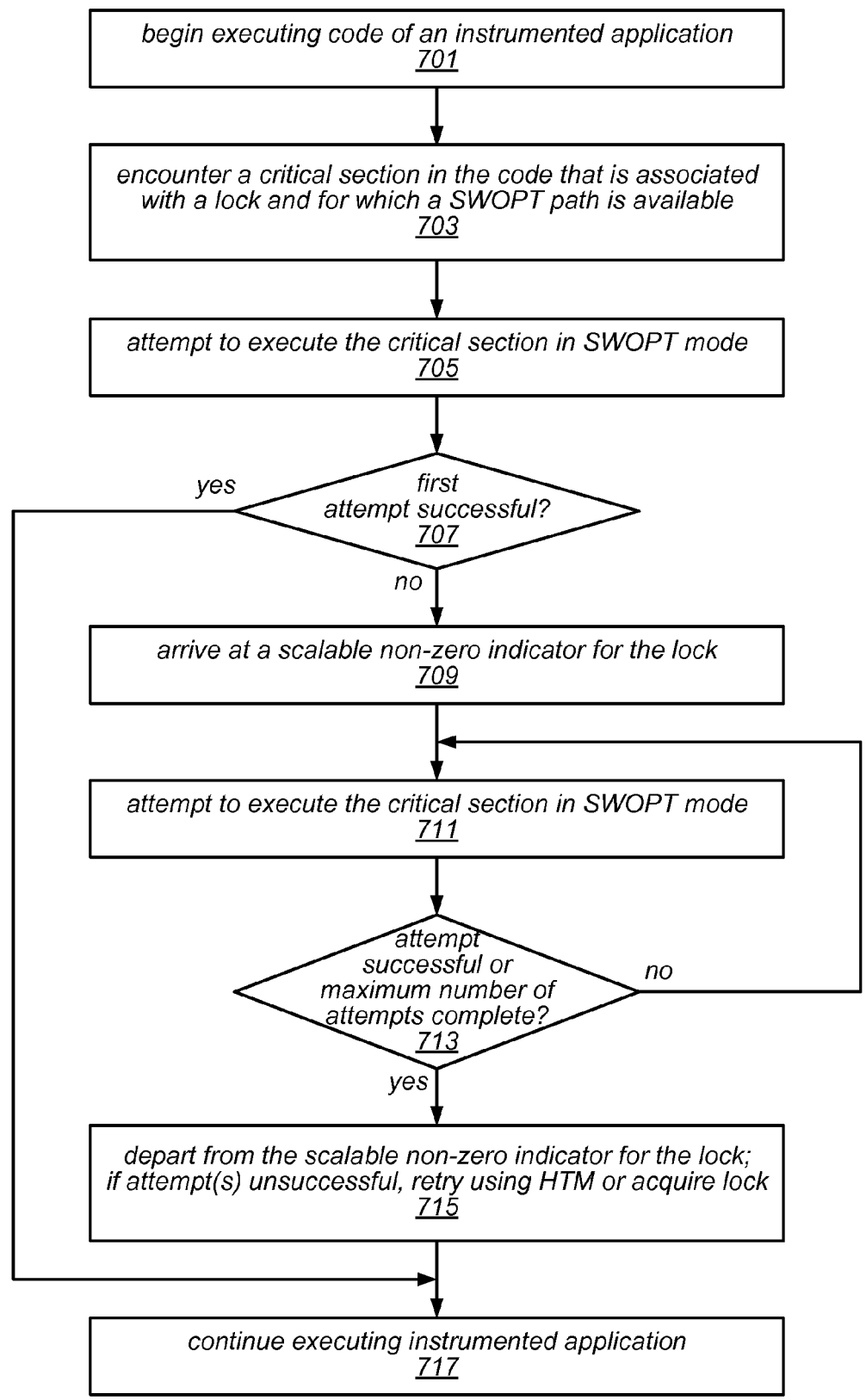
FIGS. 7A-7B are flow diagrams illustrating one embodiment of a method for implementing the grouping of critical sections for execution using the same lock elision mechanisms when multiple lock elision mechanisms are available, as described herein.
Figure 7B:
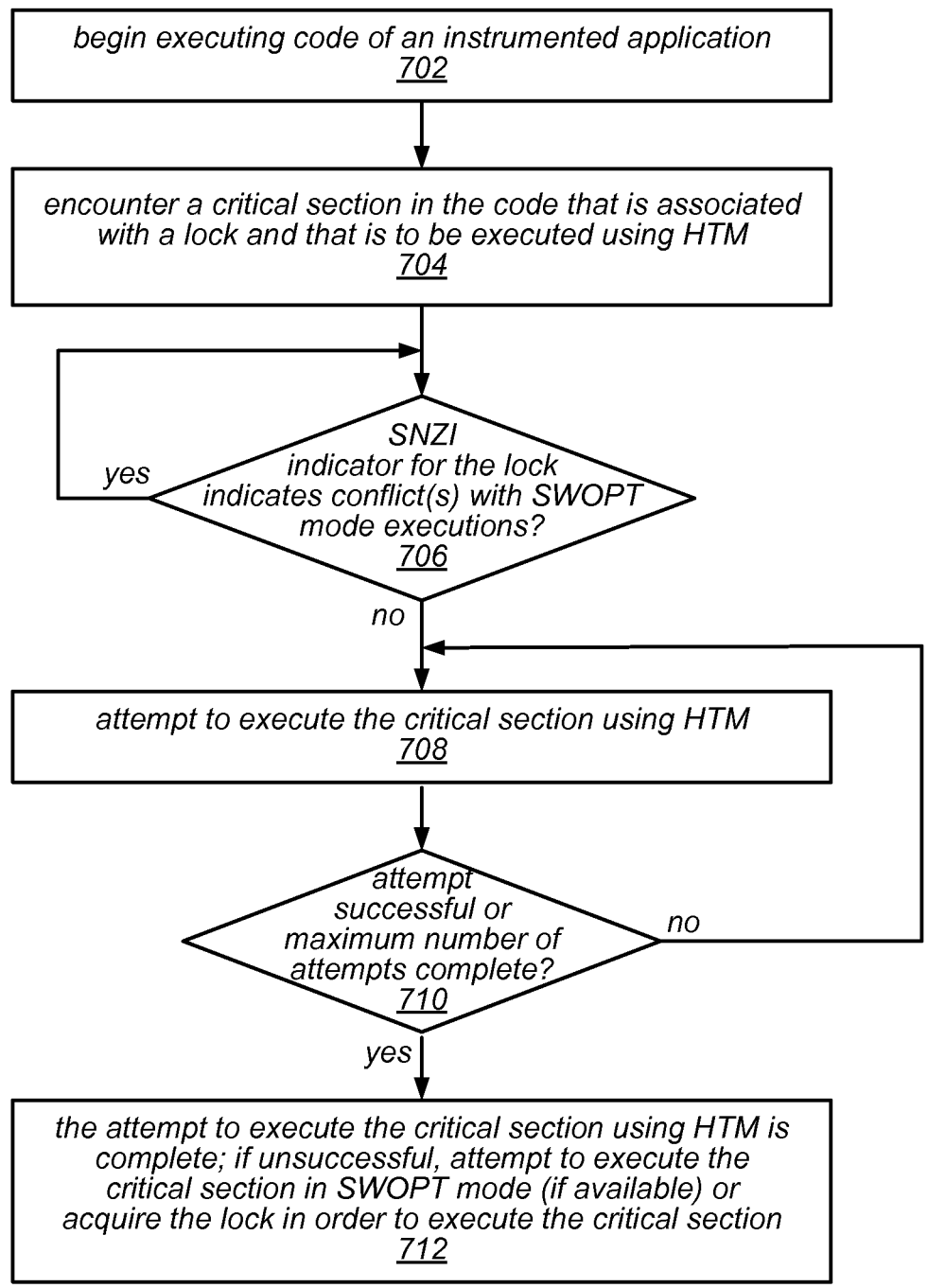

One embodiment of a method for implementing the grouping of critical sections for execution using the same lock elision mechanisms when multiple lock elision mechanisms are available is illustrated by the flow diagrams in FIGS. 7A and 7B. More specifically, FIG. 7A illustrates the execution of a critical section in a SWOPT mode while indicating to other processes or threads that a critical section is failing to execute in SWOPT mode, and FIG. 7B illustrates that a process or thread encountering a critical section to be executed using hardware transactional memory waits for any threads that are currently attempting to execute critical sections in SWOPT mode to complete those attempts before executing the critical section in HTM mode. As illustrated at 701 in FIG. 7A, the method may include beginning to execute code of an instrumented application (e.g., one that has been instrumented to take advantage of at least some of the lock elision techniques described herein). In response to encountering a critical section in the code that is associated with a lock and for which a SWOPT path is available (as in 703), the method may include attempting to execute the critical section in SWOPT mode (as in 705). For example, the method may include determining the context for the critical section, determining a policy to be applied when selecting a mode in which to execute the critical section in that context, and (according to the applied policy) selecting an optimistic alternative path (a SWOPT path) to be used in executing the critical section (not shown).

As illustrated in this example, if the first attempt to execute the critical section in SWOPT mode is successful (shown as the positive exit from 707), the method may include continuing to execute the instrumented application (as in 717). However, if the first attempt to execute the critical section in SWOPT mode is not successful (shown as the negative exit from 707), the method may include arriving at a scalable non-zero indicator (SNZI) for the lock (as in 709), thus incrementing an underlying counter of the SNZI. In this example, if a first attempt to execute the critical section in SWOPT mode is unsuccessful, incrementing the underlying counter of the SNZI may cause the SNZI to indicate (or continue to indicate) that at least one process or thread is currently executing a critical section associated with the lock in a SWOPT mode. After arriving at the SNZI, the method may include retrying the attempt to execute the critical section in SWOPT mode one or more times, e.g., until an attempt is successful or until a pre-determined maximum number of such attempts have been completed (successfully or otherwise). This is illustrated in FIG. 7A by elements 711 and 713 and the feedback from the negative exit of 713 to 711.

As illustrated in this example, once an attempt to execute the critical section in SWOPT mode is successful or the pre-determined maximum number of attempts to execute the critical section in SWOPT mode have been completed (shown as the positive exit from 713), the method may include departing from the scalable non-zero indicator for the lock (thus decrementing the underlying counter of the SNZI), as in 715. If attempts to execute the critical section in SWOPT mode were unsuccessful, the method may also include retrying execution of the critical section in HTM mode (if available) or by acquiring the lock, either of which may be assumed (in this example) to eventually succeed. As illustrated in this example, once the critical section has been successfully executed (whether in SWOPT mode, HTM mode, or by acquiring the lock), the method may include continuing execution of the instrumented application, as in 717.

FIG. 7B illustrates a method for executing, in HTM mode, a critical section that is associated with the same lock that is associated with a different critical section for which an attempt is currently being made to execute in SWOPT mode. As noted above, in this example, the method may include the potentially conflicting critical section that is to be executed using hardware transactional memory waiting for any threads that are currently attempting to execute critical sections associated with the same lock in SWOPT mode to complete those attempts before executing the potentially conflicting critical section in HTM mode. As illustrated at 702 in FIG. 7B, the method may include beginning to execute code of an instrumented application (e.g., one that has been instrumented to take advantage of at least some of the lock elision techniques described herein). In response to encountering a critical section in the code that is associated with a lock and that is intended to be executed in HTM mode (as in 704), the method may include determining whether there are any conflicting SWOPT mode executions. For example, the method may include determining the context for the critical section, determining a policy to be applied when selecting a mode in which to execute the critical section in that context, and (according to the applied policy) selecting (at least initially) HTM mode for execution of the critical section (not shown).

As illustrated in this example, determining whether there are any conflicting SWOPT mode executions may include determining whether a SNZI indicator for the lock indicates that an underlying counter has a value of zero (indicating that there are no conflicts with concurrent SWOPT mode executions) or a non-zero value (indicating that there may be a conflict with one or more concurrent SWOPT mode executions), as in 706. If the SNZI indicator for the lock indicates that at least one attempt to execute a potentially conflicting critical section in SWOPT mode is in progress (e.g., if the SNZI indictor for the lock indicates that the underlying counter has a non-zero value), the method may include waiting for all such SWOPT mode executions to drain (whether they complete successfully or not) prior to attempting to execute the newly encountered critical section in HTM mode. For example, the method may include waiting for the SNZI to indicate that the underlying counter has a value of zero and, thus, that all threads or processes that arrived at the SNZI for the lock while attempting to execute a critical section in SWOPT mode have since departed the SNZI, as shown in FIG. 7A, whether the attempts to execute those critical sections were successful or pre-determined limits on the maximum number of attempts were exhausted without successfully executing them. This is illustrated in FIG. 7B by the feedback from the positive exit of 706 to its input.

As illustrated in this example, once any conflicting SWOPT mode executions have drained (i.e., once the current attempts to execute critical sections in SWOPT mode have completed), or if there were no conflicting SWOPT mode executions in progress when the critical section was encountered (shown as the negative exit from 706), the method may include attempting to execute the newly encountered critical section using hardware transactional memory (as in 708). If the attempt to execute the newly encountered critical section in HTM mode is successful, or once a pre-determined maximum number of attempts to execute the newly encountered critical section in HTM mode has been exhausted, shown as the positive exit from 710, the attempt to execute the newly encountered critical section using hardware transactional memory may be complete (as in 712). For example, the method may include repeating the attempt to execute the newly encountered critical section using hardware transactional memory until one of the attempts is successful or until the pre-determined maximum number of attempts to execute the newly encountered critical section in HTM mode has been exhausted. This is illustrated in FIG. 7B as the feedback form the negative exit of 710 to 708. As noted at 712, if repeated attempts to execute the newly encountered critical section in HTM mode are unsuccessful, the method may include acquiring the lock and executing the critical section while the lock is held.

Note that in embodiments that support a grouping mechanism such as that described above, if each of multiple threads encountering a critical section that is associated with the same lock employ a method such as that illustrated in FIG. 7A to indicate (through the use of the SNZI) that they are attempting to execute their critical sections in SWOPT mode, and if any other threads attempting to execute critical sections that are associated with the same lock in HTM mode employ a method such as that illustrated in FIG. 7B, the attempts to execute critical sections in SWOPT mode may be performed in parallel (or in an overlapping fashion) until they are successful or until a pre-determined maximum number of attempts have been made, prior to allowing any other threads that are attempting to execute critical sections that are associated with the same lock in HTM mode or in Lock mode to begin their attempts. In other words, the execution of critical sections in HTM mode or Lock mode that might conflict with executions of a group of SWOPT paths associated with the same lock may be delayed while the grouped SWOPT paths execute concurrently. In other embodiments that support a grouping mechanism such as that described above, multiple threads that are attempting to execute their critical sections in HTM mode or in SWOPT mode that do not conflict with each other may be allowed to perform those attempts in parallel (or in an overlapping fashion) prior to allowing other threads that wish to acquire the lock(s) associated with those critical sections to execute (one at a time).

Policies

Several example policies that have been evaluated to date were designed with the assumption that it is best to attempt to use HTM before trying other methods if it is likely to eventually succeed (e.g., regardless of the number of retries required), and similarly that using a SWOPT path (if available) is preferable to acquiring the lock. Two types of policies that have been implemented based on this assumption are described below: static policies based on fixed parameters for all locks and critical sections, and adaptive policies that attempt to determine good parameters for each critical section (or more accurately, each context) at runtime based on observed behavior. In other embodiments, different static and adaptive policies may be designed that do not rely on these assumptions.

In one example, a static policy uses fixed values for the maximum number of attempts to execute a critical section using various lock elision techniques for all critical section executions. For example, under this policy, a thread may make up to X attempts using hardware transactional memory (if available), and if unsuccessful may make up to Y attempts using a SWOPT path (if available), where X and Y are fixed parameter values. The thread may finally resort to acquiring the lock if these attempts are unsuccessful.

Figure 8A:
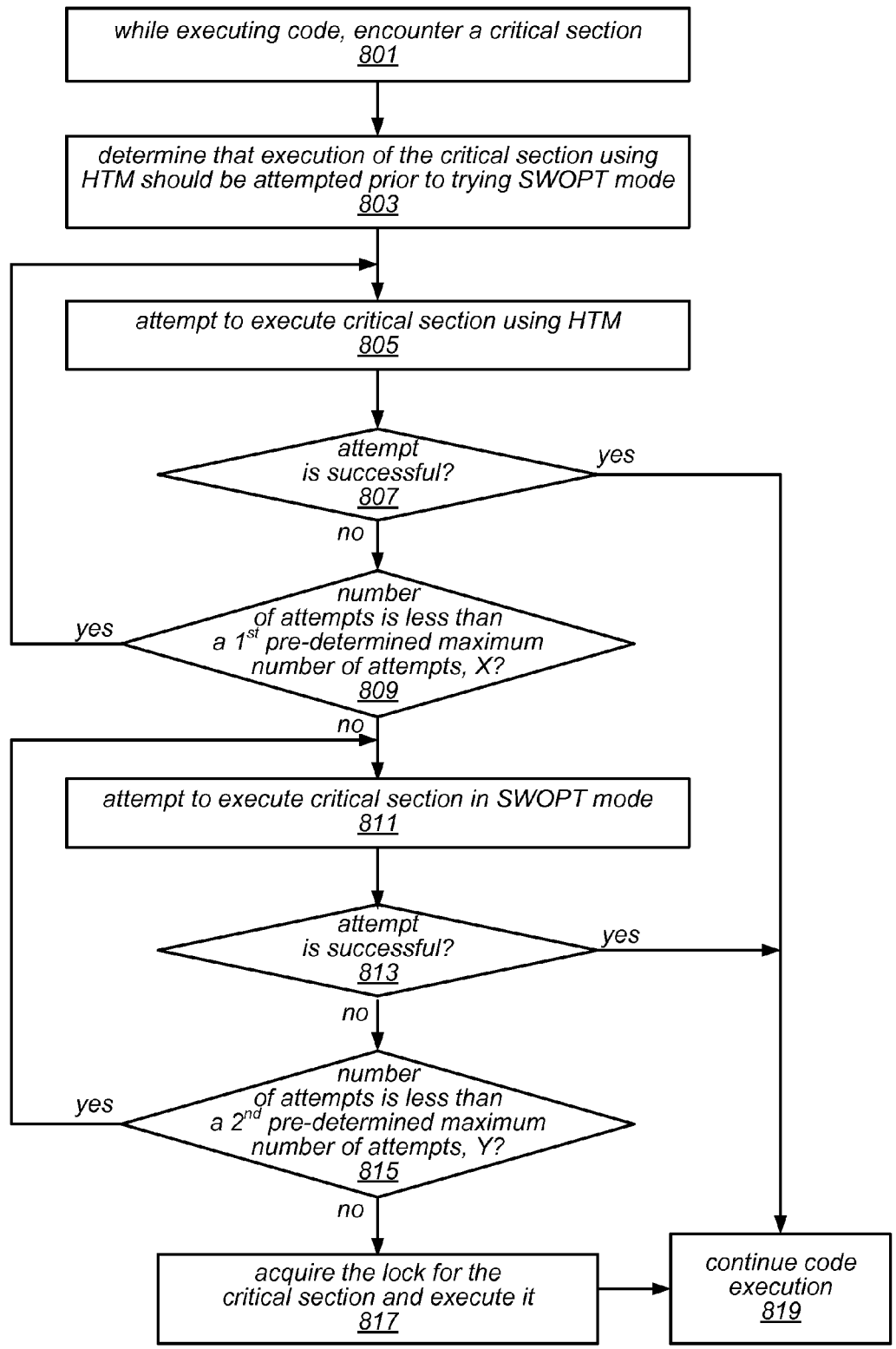
FIG. 8A is a flow diagram illustrating one embodiment of a method for using a static policy in implementing lock elision in a system that supports multiple integrated lock elision mechanisms, as described herein.

FIG. 8A is a flow diagram illustrating one embodiment of a method for using a static policy in implementing lock elision in a system that supports multiple integrated lock elision mechanisms, as described herein. More specifically, FIG. 8A illustrates an example in which both HTM and a SWOPT path are available for a given critical section. As illustrated in this example, the method may include, while executing code, encountering a critical section in the code (as in 801). The method may also include determining that execution of the critical section using hardware transactional memory should be attempted prior to attempting to execute the critical section in SWOPT mode (i.e., using an available SWOPT path), as in 803. In other words, the method may include determining that an attempt should be made to execute the critical section using HTM mode, even if both HTM and SWOPT modes are available. In some embodiments, the context in which the critical section was encountered may have been determined, and a policy that is applicable in the given context may indicate that the HTM mode should be attempted first. In other embodiments, the programmer may have included something in the code that explicitly, indirectly, and/or conditionally indicates a context, a policy selection, or the selection of one of multiple integrated lock elision mechanisms, rather than that a lock associated with the critical section should be acquired (not shown).

In response to determining that a first attempt to execute the critical section should be made using hardware transactional memory, the method may include attempting to execute the critical section using hardware transactional memory (as in 805). If the attempt is not successful (shown as the negative exit from 807), and if the number of attempts to execute the critical section using hardware transactional memory is less than a first pre-determined maximum number of attempts, X (shown as the positive exit from 809), the method may include repeating the attempt to execute the critical section using hardware transactional memory until it is successful or until the first pre-determined maximum number of attempts (X) to execute the critical section using hardware transactional memory has been performed. This is illustrated in FIG. 8A by the feedback from the negative exit of 809 to 805. Note that the pre-determined maximum number of attempts to execute the critical section using hardware transactional memory (X) may be different than the pre-determined maximum number of attempts to execute the critical section using the SWOPT path (Y), and that one or both of these parameter values may have been pre-determined (e.g., by the programmer or at compile time) dependent on the context, the platform on which the code is running, the workload experienced by the code or the critical section, or on other factors, in different embodiments. In some embodiments, the constants used by a static policy may be determined at compile time, and may not depend on runtime observations. For example, the user/programmer may specify different values for the constants X and Y for different critical sections or scopes/contexts, and/or may compile the program with different values for X and Y depending on the architecture on which the code will be running, or based on previously collected statistics.

If, after repeated attempts to execute the critical section in HTM mode (e.g., after X such attempts), these attempts have not been successful, the method may include repeatedly attempting to execute the critical section optimistically (e.g., using an optimistic alternative path, or SWOPT path, which may include invoking an alternative software method) up to a second pre-determined number of times Y until it is successful or until the second pre-determined maximum number of attempts (Y) has been performed. This is illustrated in FIG. 8A by element 811, and by the path from the negative exit of 813 to 815 and then from the negative exit of 815 back to 811. Again note that the pre-determined maximum number of attempts to execute the critical section using SWOPT mode (Y) may be different than the pre-determined maximum number of attempts to execute the critical section using HTM mode (X), in some embodiments.

If the attempt to execute the critical section has still not succeeded after Y attempts to execute it using SWOPT mode, the method may include acquiring the lock for the critical section and executing the critical section (as in 817). In other words, if repeated attempts to execute the critical section using either of these types of lock elision mechanisms (HTM and SWOPT) are not successful, the method may include acquiring the lock and executing the critical section while holding the lock. Once an attempt to execute the critical section has succeeded using hardware transactional memory (shown as the positive exit from 807), using a SWOPT path (shown as the positive exit from 813), or by acquiring the lock (as in 817), the method may include continuing execution of the code (e.g., the code outside of the critical section), as in 819.

Note that in embodiments in which a SWOPT path is available but HTM is not available, in response to encountering a critical section of code, one or more attempts to execute the critical section using SWOPT mode may be attempted (e.g., up to a pre-determined maximum number attempts), before resorting to lock acquisition (if necessary), as in elements 811-819, or the lock may be acquired with first attempting to execute the critical section in SWOPT mode. Conversely, in embodiments in which HTM is available but a SWOPT path is not available, in response to encountering a critical section of code, one or more attempts to execute the critical section using HTM may be attempted (e.g., up to a pre-determined maximum number attempts), before resorting to lock acquisition (if necessary), as in elements 805-809 and 819, or the lock may be acquired after first attempting to execute the critical section using HTM.

As shown by way of the following example, an adaptive policy may be more flexible and more dynamic than the static policy described above in several ways. For example, while this adaptive policy follows a similar progression as the static policy, it uses a learning mechanism to determine X and Y parameter values dynamically (at runtime), and may employ separate X and Y parameters for each granule (i.e., each combination of lock and context). In some embodiments, such a learning phase may allow the policy to recognize, for example, that one critical section may be highly likely to succeed using hardware transactional memory, while another will never do so, and to adapt accordingly, or to determine that the fastest execution of one critical section is likely to be achieved by using HTM, while SWOPT is preferable for another. In some embodiments, the policy may allow different choices to be made even for the same critical section used within different contexts and/or with different locks. In some embodiments, adaptive policies may exploit ALE's fine-grained metadata to improve performance by controlling concurrency. In such embodiments, these concurrency control mechanisms may seek to maximize concurrency while avoiding the need to acquire the lock (except in rare circumstances) if a SWOPT path is available. This may be demonstrated by the grouping mechanism described above.

In one embodiments, the adaptive policy may go through several learning phases for each lock, each phase collecting information for one of the following mode progressions: Lock mode only, HTM+Lock modes, HTM+SWOPT+Lock modes, and SWOPT+Lock modes. In each learning phase, per-granule statistics may be collected, which may include the average critical section execution time. The policy may then choose, for each granule, the combination that minimizes this time. Techniques for choosing the X and Y parameter values for each granule are described below, according to one embodiment. In this example, the transition between different learning phases for a lock L may occur when all contexts of L that have been encountered so far have each performed a pre-determined number of executions (e.g., 200), or when some context completes a large number of executions (e.g., 400). The latter condition may ensure that the transition occurs even if some context of L does not execute often.

In this example, in order to choose values for the X parameters, phases for combinations that include HTM mode are divided into three sub-phases. In the first sub-phase, X is initially set to a large number, and its value is adjusted based on the actual number of attempts required to complete the critical section successfully in HTM mode. In the second sub-phase, using the value learned in the first, a histogram of the number of attempts required to succeed in HTM mode is created. Finally, using the histogram, X is set to the number of attempts required by a large fraction of executions (e.g., 90%) to succeed in HTM mode. This number is used in the third sub-phase to collect timing data for this learning phase.

In this example, a similar approach may be used to choose Y parameter values. However, when employing the grouping mechanism, described above, critical sections attempted using SWOPT paths may almost never revert to acquiring the lock (except when explicitly caused to revert to the lock by the self-abort idiom described above). Therefore, in some embodiments, Y may be set to a high value in order to detect bugs that might violate this expected behavior (although this has not been observed in the evaluations performed thus far). In other embodiments, more sophisticated policies may be used to adapt Y, as well. These more sophisticated policies may be especially useful for applications that have workloads with complex nesting that cannot always depend on the grouping mechanism described herein to guarantee eventual completion.

Note that the learning mechanism employed by this example adaptive policy may be limited in its ability to find the best configuration of execution modes for all contexts. In particular, in each learning phase for a given lock, all contexts that use that lock may execute with the same mode progression (even though the X values can differ). However, it is quite possible that the fastest execution of contexts A and B may be achieved when, for example, A is run in HTM+Lock combination and B is run in SWOPT+Lock combination, but this configuration may or may not have been tested during the learning phase. In some systems, going through all possible configurations during the learning phase may be impractical, as it may be exponential in the number of contexts. However, in other embodiments, more sophisticated learning mechanisms may be employed to find the best combinations of execution modes for a wide variety of applications and workloads.

In another (somewhat simpler) example of an adaptive policy, each context (or granule) may begin executing with X=10. Thus, HTM mode may initially be attempted up to 10 times before switching to SWOPT mode, if a SWOPT path exists, or acquiring the lock, otherwise. In this example, after a particular context is executed 50 times, the X parameter for that context may be set to twice the average number of trials used by those executions that succeeded using HTM, provided enough of the 50 attempts succeeded. Otherwise X may be set to zero, thus disabling HTM for that context. Thereafter, this new value of X may be fixed. Other adaptive policies, such as the one described above, may be able to adapt to workload characteristics that change over time.

A similar approach may be used to set the Y parameter, in some embodiments. However, as noted above, in embodiments in which grouping is employed, the HashMap workloads used in evaluating this policy never required a critical section that has an SWOPT path to acquire the lock. Therefore, in this example, Y may merely be set to a very high value, as in the previous example.

Figure 8B:
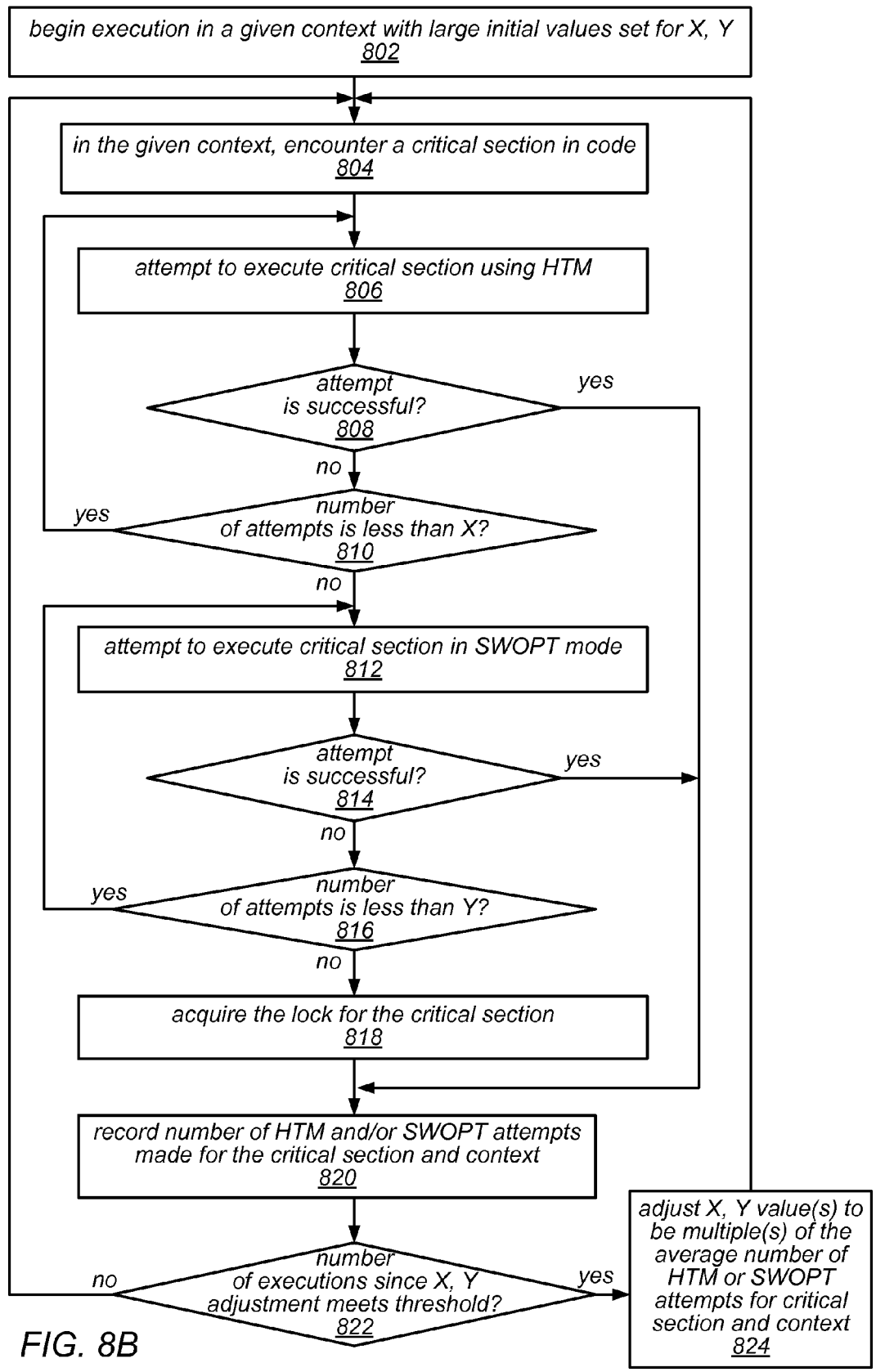
FIG. 8B is a flow diagram illustrating one embodiment of a method for using a dynamic policy in implementing lock elision in a system that supports multiple integrated lock elision mechanisms, as described herein.

FIG. 8B is a flow diagram illustrating one embodiment of a method for using a dynamic policy in implementing lock elision in a system that supports multiple integrated lock elision mechanisms, as described herein. The method illustrated in FIG. 8B is similar to that illustrated in FIG. 8A, except that the pre-determined maximum number of attempts to perform the critical section of code (X and Y) in a particular context may initially be set to relatively large numbers, but after a pre-determined number of successful executions of critical sections associated with a particular lock (in the particular context), these values may be adjusted based on having recorded the numbers of HTM mode and/or SWOPT mode (optimistic) attempts made for the critical section (in the same context) each time the critical section was successfully executed. As illustrated in this example, in some embodiments, the values of X and Y may be adjusted each time a particular number of successful execution attempts has been performed.

As illustrated at 802 in FIG. 8B, the method may include beginning execution of a critical section that is associated with a lock in a given context, with initial values for X and Y (representing the maximum number of attempts to execute a given critical section of code in HTM mode and in SWOPT mode, respectively) set to relatively large numbers. The method may include, while executing code, encountering a critical section in the code (as in 804), and attempting to execute the critical section using hardware transactional memory (as in 806). For example, in some embodiments, the method may include determining that execution of the critical section using hardware transactional memory should be attempted prior to attempting to execute the critical section in SWOPT mode (i.e., using an available SWOPT path), based on the context and/or on a policy that is applicable in the given context (not shown). In other embodiments, the programmer may have included something in the code that explicitly, indirectly, and/or conditionally indicates a context, a policy selection, or the selection of one of multiple integrated lock elision mechanisms, rather than that a lock associated with the critical section should be acquired (not shown).

As illustrated in this example, if the attempt to execute the critical section using hardware transactional memory is not successful (shown as the negative exit from 808) and the number of attempts to execute the critical section using hardware transaction memory is less than the value of X (shown as the positive exit from 810) the method may include repeating the attempt to execute the critical section using hardware transactional memory until it is successful or until the number of attempts to execute the critical section using hardware transactional memory reaches the value of X. This is illustrated in FIG. 8B by the feedback from the positive exit of 810 to 806. Note that, as in the example illustrated in FIG. 8A, the initial maximum number of attempts to execute the critical section using HTM mode (X) may be different than the initial maximum number of attempts to execute the critical section using SWOPT mode (Y), and that one or both of these initial parameter values may be dependent on the context, the platform on which the code is running, the workload experienced by the code or the critical section, or on other factors, in different embodiments.

If, after repeated attempts to execute the critical section in HTM mode, these attempts are not successful, the method may include repeatedly attempting to execute the critical section optimistically (e.g., using an optimistic alternative path, or SWOPT path, which may include invoking an alternative software method), as in 812, until it is successful or until the number of attempts to execute the critical section in HTM mode reaches the value of Y. This is illustrated in FIG. 8B by the path from the negative exit of 814 to 816 and then from the positive exit of 816 back to 812. Again, note that the initial maximum number of attempts to execute the critical section using SWOPT mode (Y) may be different than the initial maximum number of attempts to execute the critical section using HTM mode (X), and that one or both of these initial parameter values may be dependent on the context, the platform on which the code is running, the workload experienced by the code or the critical section, or on other factors, in different embodiments.

If repeated attempts to execute the critical section in SWOPT mode are not successful, the method may include acquiring the lock for the critical section (as in 818). In other words, if repeated attempts to execute the critical section using either of these types of lock elision mechanisms (HTM and SWOPT) are not successful, the method may include acquiring the lock and executing the critical section while holding the lock. Once an attempt to execute the critical section has succeeded using hardware transactional memory (shown as the positive exit from 808), using a SWOPT path (shown as the positive exit from 814), or by acquiring the lock (as in 818), the method may include recording the numbers of HTM and/or optimistic attempts that were previously made for the critical section (in the same context) each time the critical section was successfully executed, as in 820. The method may also include determining whether the number of times that execution of a critical section associated with the particular lock has been performed meets a pre-determined threshold value (as in 822). If so, the method may include adjusting the X and/or Y value(s) and continuing execution of the code. For example, in some embodiments, the X and/or Y value(s) may be adjusted such that they are equal to multiple(s) of the average number of HTM mode or SWOPT mode attempts (respectively) to execute critical sections associated with the particular lock in the current context (as in 824). Whether or not the values of X and/or Y are adjusted, the method may include continuing execution of the code, which may include encountering one or more additional critical sections that are associated with the particular lock. This is illustrated in FIG. 8B as the feedback from the negative exit of 822 to 804 and from the 824 to 804.

Statistics Counters

As described above, in some embodiments, adaptive lock elision policies may maintain historical summary information to guide their future decisions. Some examples of the types of information that may be collected for subsequent analyses include various counts of events (such as the number of attempts and/or successful attempts to execute a critical section that were performed using a given method and in a particular context), and timing information (such as the average execution time or the average lock acquisition time). In some embodiments, multiple different approaches may be used to avoid excessive overhead and/or any potential contention that could be caused by naïve methods for synchronizing this summary information.

In some embodiments, in order to generate summaries of time intervals, approximately 1% of the events in a given time period of interest may be sampled, and a CAS operation may be used to update per-lock or per-context (shared) summary variables. In some embodiments, exponential backoff may be employed to mitigate any remaining contention, which may typically be low due to this sampling approach. While this approach may be relatively simple to implement and reasonably effective, it may not provide a reliable level of accuracy until many hundreds of sampled events have been measured.

For counting events, a higher level of accuracy may be desirable, especially when sampling a relatively smaller number of events. Therefore, in some embodiments, a statistical counter algorithm (e.g., the BFP algorithm) may be used, which may gradually reduce the probability of updating shared data (e.g., the shared variable representing a counter). In some embodiments, this algorithm may support counters that are incremented only by one, and thus may not be suitable for recording time-based statistics.

Figure 9:
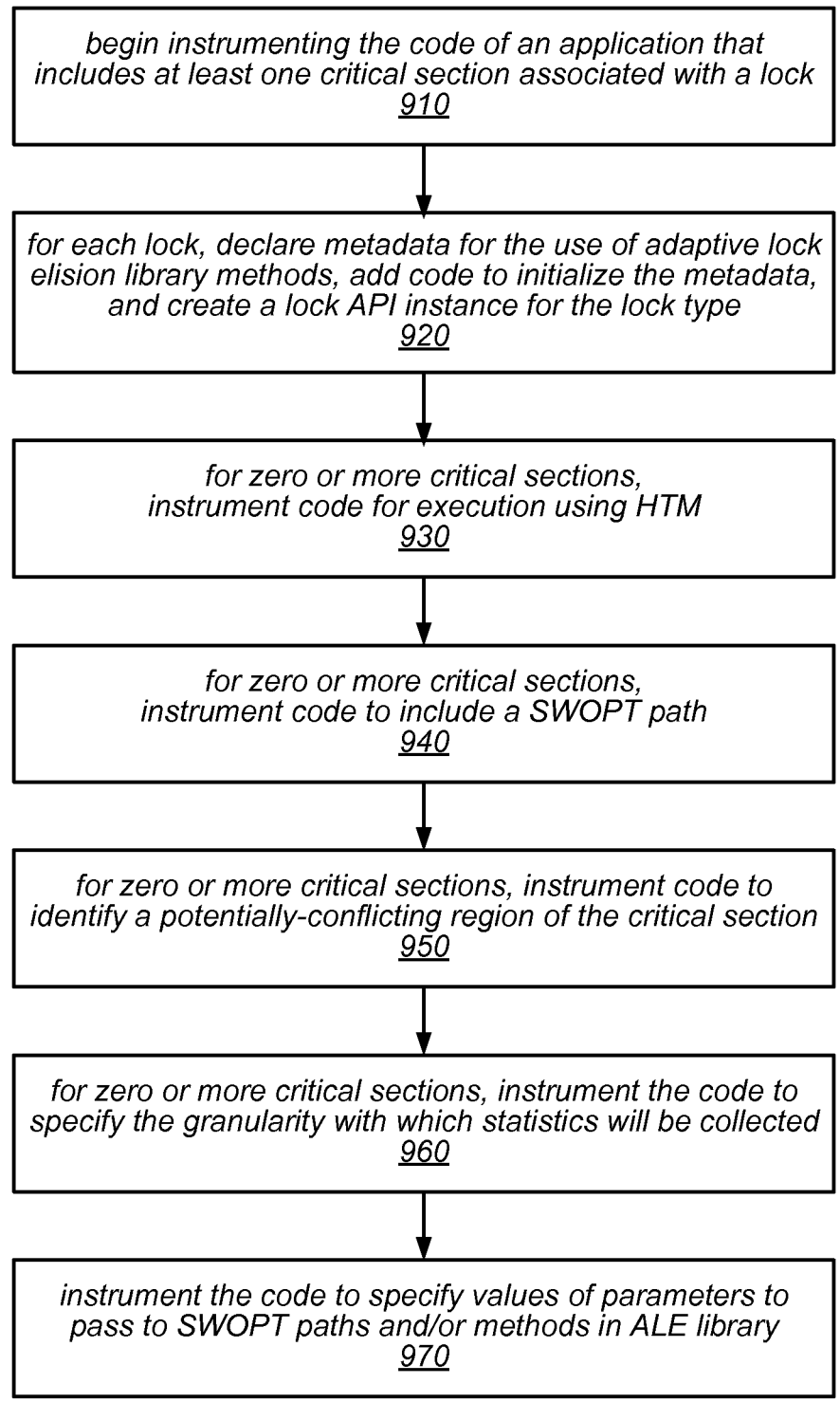
FIG. 9 is a flow diagram illustrating one embodiment of a method for instrumenting code to take advantage of at least some of the lock elision techniques described herein.

One embodiment of a method for instrumenting code to take advantage of at least some of the lock elision techniques described herein is illustrated by the flow diagram in FIG. 9. As illustrated at 910, in this example, the method may include beginning to instrument (e.g., consistent with the API of an ALE library) the code of an application that includes at least one critical section associated with a lock. In this example, for each such lock, the method may include declaring metadata for the use of one or more adaptive lock elision library methods, adding code to initialize the metadata, and/or creating a lock API instance for the lock type, as in 920. For example, each lock API instance may define lock, unlock, and is_locked methods (such as those described herein) for a particular lock type.

As illustrated at 930 in FIG. 9, in some embodiments the method may, optionally, include, for any given critical section in the code of the application, instrumenting the code for execution using hardware transactional memory. For example, in some embodiments, this may include replacing lock acquire and release calls at the boundaries of a critical section with calls to ALE library macros (such as BEGIN_CS, and END_CS) that specify the appropriate lock and lock API instance. These macros may perform (or invoke) the collection of various statistics and/or profiling information about the executions of the critical section. In some embodiments, these macros may employ counters, SNZI objects, version numbers that are associated with locks or granules, or other mechanisms to assist in managing the execution of critical sections and/or collecting information to inform execution mode decisions.

As illustrated at 940 in FIG. 9, in some embodiments the method may, optionally, include, for any given critical section in the code of the application, instrumenting the code to include a SWOPT path. For example, a SWOPT path may be included in the code in addition to a path that relies on HTM, to support TLE or instead of a path that relies on HTM (e.g., if HTM is not available, supported, enabled, or suitable for executing the instructions in a particular critical section). In some embodiments, the code for a SWOPT path may include statements that are executed conditionally, dependent on the value of an input parameter. For example, the SWOPT path may be executed only if a particular condition on a counter, SNZI object, version number, or variable is met. Note that in some embodiments, the library grouping mechanisms described herein may ensure that HTM executions (and Lock mode executions) can determine whether or not there are any potential conflicts with concurrently executing SWOPT paths (e.g., conflicts on accesses to critical sections or shared resources that are protected by the same locks). For example, the library may assume that any critical section executing using HTM or Lock mode could (potentially) conflict with SWOPT executions associated with the same lock, and may delay its execution until concurrently failing SWOPTs are finished executing.

As illustrated at 950 in FIG. 9, in some embodiments the method may, optionally, include, for any given critical section in the code of the application, instrumenting the code to explicitly identify a potentially-conflicting region of the critical section (e.g., if only a portion of the critical section is actually likely to cause a conflict or be a party to a conflict). As illustrated in FIG. 9, in some embodiments the method may, optionally, include, for any given critical section in the code of the application, instrumenting the code to specify the granularity at which statistics will be collected (as in 960) and/or to specify the values of various parameters to be passed to SWOPT paths and/or methods in an ALE library (as in 970). For example, if the programmer has knowledge of when and/or if potential conflicts can or cannot occur, the programmer may instrument the code to provide hints or directives to guide the selection of a policy and/or an execution mode for a given critical section in a particular context.

Note that in various embodiments, instrumenting the code of an application to take advantage of multiple integrated lock elision mechanisms may include any or all of the techniques illustrated in FIG. 9 and described above and/or other techniques. In some embodiments, some or all of these code modifications may be made if (and only if) the programmer explicitly indicates that they should be applied in a given critical section or context, e.g., based on the programmer's knowledge about potential conflicts, or the programmer's knowledge about the likelihood that a particular execution mode will (or will not) be successful (eventually) for a given critical section or context.

Evaluation

The techniques described herein for implementing adaptive lock elision (in which decisions about when and how to apply different ones of multiple lock elision mechanisms supported in a single system are adaptive to context, policies selected by the programmer, input from the programmer, workloads, and/or other factors) were evaluated using a Hash-Map microbenchmark and a benchmark of an open source database on a variety of platforms. These platforms included two platforms that support best-effort HTM (a single-socket, hyper-threaded, 4-core system, and a single-socket, 16-core system) and two that do not support HTM (a 64-thread, single-socket system, and a 128-thread, two-socket system with processor chips from an earlier generation of the same architecture). These experiments were used to demonstrate the ability of ALE to adapt to different hardware capabilities (in particular, the amount of data hardware transactions can write), and to insights that the data collected by the library provide about the system's behavior.

The HashMap microbenchmark used in these experiments was inspired by popular key-value stores. The HashMap includes a fixed number of buckets, each of which holds an unsorted linked list of key-value pairs. Pairs are mapped to their respective buckets by hashing their keys. The HashMap supports Insert, Remove and Get operations. In these experiments, only the Get operation included a SWOPT path.

As part of this evaluation, each experiment included a specific combination of the lock elision techniques described herein (e.g., HTM mode and/or SWOPT mode) and a specific static or adaptive policy. In some experiments, the benchmark application was instrumented for integration with the ALE library, so that statistics and profiling information was made available, but only the lock was used to execute critical sections. In other experiments, different lock elision techniques were used (HTM and/or SWOPT) in combination with various policies. For example, in some experiments, a static policy was applied in which only HTM was enabled and at most 10 HTM attempts were applied. In other experiments, a static policy specified a maximum number of HTM attempts, to be followed (if needed) by SWOPT attempts up to a separately specified number of attempts. In some experiments, an adaptive policy exploited SWOPT mode to achieve dramatically better performance in large-object cases.

The conclusion from these experiments was that the adaptive policy was consistently competitive with the best policy in each experiment, and often outperformed all others by a significant margin. In contrast, all static policy configurations were significantly outperformed by the adaptive policy, in some experiments.

These experiments provided strong evidence that adaptive policies may be necessary for selecting the best execution modes for some applications and that they can be effective in eliminating the need to tune policies manually to adapt to numerous aspects of platforms and workloads, (including, but not limited to: the availability and capabilities of HTM and/or a SWOPT path, the size of operations, the number of concurrent threads, operation mixes, etc.) These results have been achieved with a preliminary and relatively simplistic adaptive policy, and further improvements may be expected in embodiments that implement more sophisticated adaptive policies.

In another set of experiments, the ALE library was used with a more substantial benchmark application, one that implements an in-memory hash database in which a random series of operations are applied on the database. In these experiments, some operations (such as beginning and ending a database transaction) require exclusive access to the database, and a readers-writer lock (RW-lock) was used to allow such operations to prevent any access to the hash table when they execute, but to otherwise allow concurrent access to different slots in the hash table. Using the profiling information provided by the ALE library (without enabling an SWOPT path or HTM), it was determined that the RW-lock was the primary source of contention in the benchmark, suggesting it would be a good candidate for enabling HTM and/or an SWOPT path. In these experiments, it was again demonstrated that adaptive policies can perform comparably with the best static policy, without requiring manual tuning Using ALE with Arbitrary Lock Types Note that the ideas presented herein may be generalized to other types of locks and/or other types of synchronization mechanisms, in different embodiments. As previously noted, in some embodiments, in order to use a lock type that is not directly supported by the ALE library (e.g., because it does not support the is_locked functionality), a programmer may create an instance of lock_api_t for each type of lock used by the application. For example, the following example pseudocode defines an instance of lock_api_t using pthread_mutex_t locks, using the techniques described herein to augment any lock type to support an is_locked method.

```
1    struct LockAndFlag {
2        pthread_mutex_t lock;
3        volatile uint32_t isLocked;
```

-continued

```
 4      };
 5      typedef struct LockAndFlag MyLockType;
 6
 7      void lockInit(MyLockType* lockP) {
 8          pthread_mutex_init(&lockP->lock, NULL);
 9          lockP->isLocked = false;
10      }
11
12      void Lock(void* lockAndFlagP) {
13          MyLockType* l = (MyLockType*)lockP;
14          pthread_mutex_lock(&l->lock);
15          l->isLocked = true;
16      }
17      void UnLock(void* lockAndFlagP) {
18          MyLockType* l = (MyLockType*)lockP;
19          l->isLocked = false;
20          pthread_mutex_unlock(&l->lock);
21      }
22      uint32_t IsLocked(void* lockAndFlagP) {
23          MyLockType* l = (MyLockType*)lockP;
24          return l->isLocked;
25      }
26
27      lock_api_t MyLockAPI={&Lock,&UnLock,&IsLocked)
```

This lock_api_t instance provides pointers to functions for the library to use to lock and unlock the lock, and to determine whether it is currently locked (e.g., an is_locked function). The latter function may be called within hardware transactions when executing a critical section in HTM mode, allowing the transaction to ensure that it commits successfully only if the lock is not held. In various embodiments, the is_locked function may be supported directly by the given lock type, or may be implemented by the programmer. As noted above, it may not be required to return true if and only if the lock is held. Instead, a conservative approximation may suffice.

CONCLUDING REMARKS

The ALE library described herein may in some embodiments be used to integrate transactional lock elision using hardware transactional memory and optimistic execution of operations in software, so that either technique can be used to improve performance and scalability. In various embodiments, decisions regarding whether, when and which technique to use may be made by a pluggable policy, whose decisions may be guided (at least in part) by profiling information and statistics collected by the library. This may allow the best choice of mechanism to be made at runtime based on the platform, availability of hardware features, and workload characteristics. The potential of this approach has been demonstrated by showing that it is possible to achieve significant improvements in performance and scalability for a hash table microbenchmark across a range of platforms and workload parameters, even though different techniques may be better for different circumstances. A relatively simple adaptive lock elision policy (one that does not adapt to changing workload characteristics) has been used to demonstrate the potential of the approach and to establish a foundation on which to explore more sophisticated adaptive lock elision policies, such as those that can adapt to workloads that change over time.

The use of an ALE library has been explored in a real example. This effort has shown that the library is valuable for analyzing an application's behavior and for assessing which locks are likely to be most profitable to optimize. It has also brought to light additional challenges that may be faced when using such techniques in realistic code bases, such as the need to support nesting.

Figure 10:
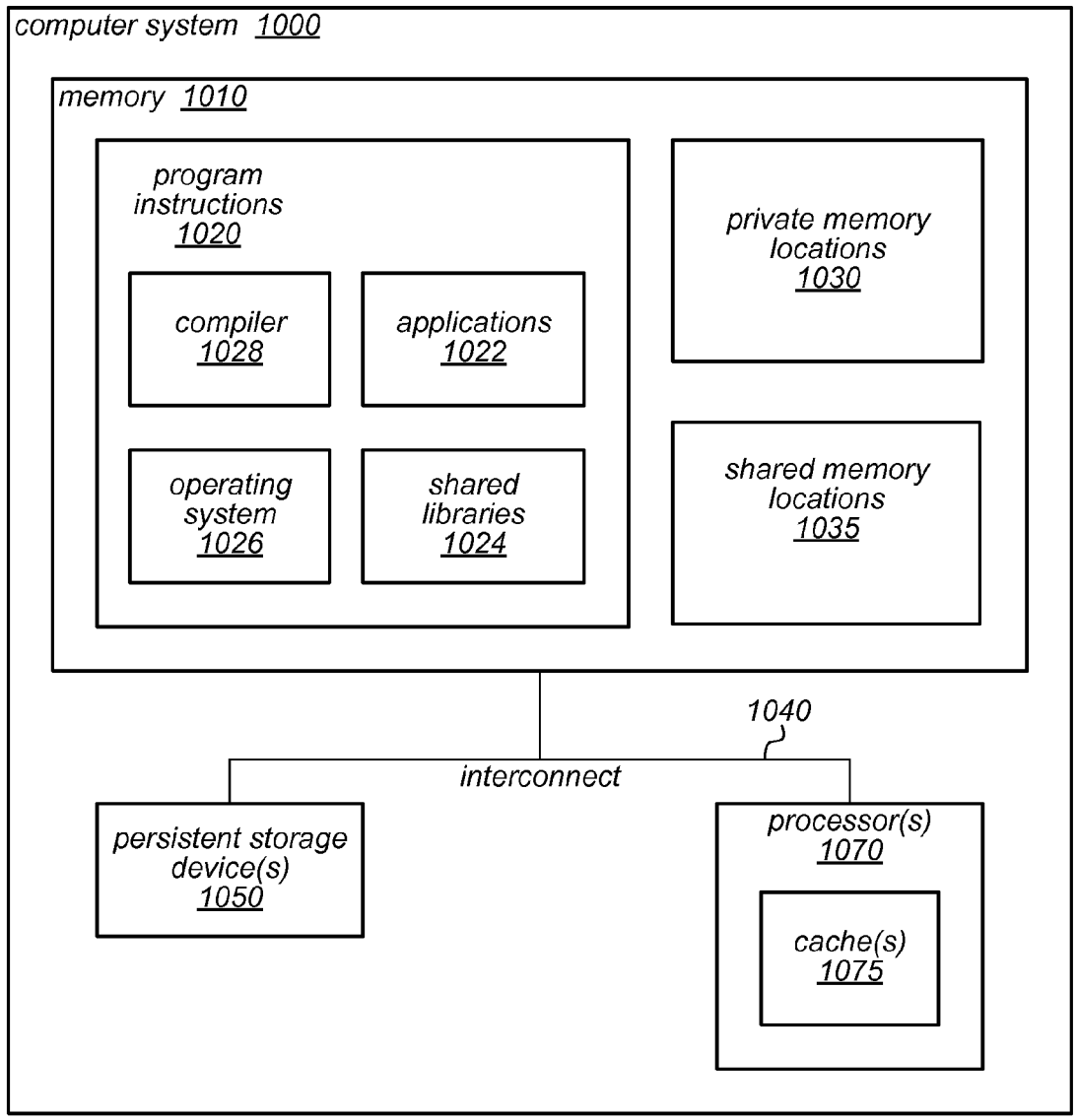
FIG. 10 is a block diagram illustrating a computing system configured to implement adaptive lock elision, according to various embodiments.

The systems and methods described herein for implementing adaptive integration of hardware and software lock elision techniques may be implemented on or by any of a variety of computing systems, in different embodiments. FIG. 10 illustrates a computing system 1000 that is configured to implement adaptive lock elision, according to various embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for implementing adaptive lock elision, as described herein, may be provided as a computer program product, or software, that may include a non-transitory, computer-readable storage medium having stored thereon instructions, which may be used to program a computer system 1000 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1000 may include one or more processors 1070; each may include multiple cores, any of which may be single or multithreaded. For example, multiple processor cores may included in a single processor chip (e.g., a single processor 1070), and multiple processor chips may be included in computer system 1000. Each of the processors 1070 may include a cache or a hierarchy of caches 1075, in various embodiments. For example, each processor chip 1070 may include multiple L1 caches (e.g., one per processor core) and one or more other caches (which may be shared by the processor cores on a single processor). The computer system 1000 may also include one or more persistent storage devices 1050 (e.g. optical storage, magnetic storage, hard drive, tape drive, solid state memory, etc) and one or more system memories 1010 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 10 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the system memory 1010 may be coupled to the system interconnect 1040. One or more of the system memories 1010 may contain program instructions 1020. Program instructions 1020 may be executable to implement one or more applications 1022 (which may include original or instrumented application source code and/or executable application code that includes one or more accesses to a critical section of code or shared resource that may be protected by lock, as described herein), shared libraries 1024 (which may include an ALE library and/or other libraries that support transactional memory, etc.), or operating systems 1026. In some embodiments, program instructions 1020 may include a compiler 1028. In some embodiments, compiler 1028 may be an optimizing compiler that is configured to apply one or more transformations and/or optimizations to application or library code that is executable to implement adaptive lock elision. In some embodiments, program instructions 1020 may be executable to implement a contention manager (not shown). In some embodiments, program instructions 1020 may also be configured to implement a transaction support library, which provides various methods for implementing atomic transactions using hardware transactional memory, STM or hybrid transactional memories (e.g., within shared libraries 1024 or elsewhere within program instructions 1020). In some embodiments, a transaction support library may include functionality to execute transactions according to various hardware and/or software transactional memory techniques. For example, in some embodiments, applications 1022 may make calls into a transaction support library for beginning and ending (i.e., committing) transactions, and/or for performing one or more accesses to shared memory locations 1035 (e.g., locations within a shared transactional memory space) from within transactions, and/or calls into an ALE library to support any or all of the adaptive lock elision techniques described herein.

Program instructions 1020 may be encoded in platform native binary, any interpreted language such as Java™ bytecode, or in any other language such as C/C++, Java™, etc or in any combination thereof. In various embodiments, compiler 1028, applications 1022, operating system 1026, and/or shared libraries 1024 may each be implemented in any of various programming languages or methods. For example, in one embodiment, compiler 1028 and operating system 1026 may be JAVA based, while in another embodiment they may be written using the C or C++ programming languages. Similarly, applications 1022 may be written using Java, C, C++, or another programming language, according to various embodiments. Moreover, in some embodiments, compiler 1028, applications 1022, operating system 1026, and/shared libraries 1024 may not be implemented using the same programming language. For example, applications 1022 may be C++ based, while compiler 1028 may be developed using C.

The program instructions 1020 may include transactional memory support, operations, or procedures, and/or other processes for implementing adaptive lock elision, as described herein. Such support and functions may exist in one or more of the shared libraries 1024, operating systems 1026, or applications 1022, in various embodiments. The system memory 1010 may further comprise private memory locations 1030 and/or shared memory locations 1035 where data may be stored (e.g., various statistics and profiling information about ALE-enabled locks and critical sections). For example, shared memory locations 1035 may include locations in a shared transactional memory space, which may support and/ or be accessed by transactions in a software transactional memory implementation, a hardware transactional memory implementation, and/or a hardware-software hybrid transactional memory implementation, in different embodiments. In some embodiments, shared memory locations 1035 may store data or other shared resources (e.g., lock data structures, including metadata, counters, or SNZI indicators) that are accessible to multiple, concurrently executing threads, processes, or transactions, and that may be protected by one or more locks, in various embodiments. In addition, the system memory 1010 and/or any of the caches of processor(s) 1070 may, at various times, store recorded values of data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of lock structures, policies, and procedures particular, it should be noted that the techniques and mechanisms disclosed herein for implementing adaptive lock elision may be applicable in other contexts in which critical sections of code and/or shared resources may be protected by other types of locks/structures under different policies or procedures than those described in the examples herein. It is intended that the following claims be interpreted to embrace all such variations and modifications.

What is claimed:

1. A method, comprising:
    performing by a computer:
        beginning execution of a multithreaded application;
        while executing the application, a thread of the application encountering a critical section of code in the application that is associated with a lock, wherein when the lock is held by a thread, other threads are prevented from entering the critical section;
        determining a context in which the critical section was encountered;
        determining a policy that is applicable to the determined context, wherein the policy is usable in determining which of a plurality of integrated mechanisms for executing the critical section without acquiring the lock is to be employed in attempting to execute the critical section;
        selecting one of the plurality of integrated mechanisms, dependent on the determined policy; and
        the thread attempting to execute the critical section using the selected one of the plurality of integrated mechanisms.

2. The method of claim 1, wherein said selecting comprises determining whether to attempt to execute the critical section using hardware transactional memory or to execute the critical section using an optimistic alternative code path.

3. The method of claim 1, wherein said determining the context is based, at least in part, on one or more of:
    an environment or platform in which the application is executing;
    availability or capability of hardware transactional memory support for executing the critical section using a hardware transaction;
    concurrent use of hardware transactional memory by another thread in executing a critical section of code in the application that is associated with the lock;
    availability of an optimistic alternative code path for the critical section;
    concurrent use of an optimistic alternative code path by another thread in executing a critical section of code in the application that is associated with the lock; or
    potential concurrent use of an optimistic alternative code path by another thread in executing a critical section of code in the application that is associated with the lock.

4. The method of claim 3, wherein said determining the context comprises detecting an indication of concurrent use of an optimistic alternative code path by one or more other threads in executing a respective critical section of code in the application that is associated with the lock or potential concurrent use of an optimistic alternative code path by one or more other threads in executing a respective critical section of code in the application that is associated with the lock.

5. The method of claim 4,
wherein said selecting comprises determining that the thread should attempt to execute the critical section using hardware transactional memory; and
wherein said attempting to execute the critical section comprises, prior to attempting to execute the critical section using hardware transactional memory, waiting for each of the one or more other threads to complete execution of its respective critical section using an optimistic alternative code path.

6. The method of claim 1,
wherein the method further comprises, prior to said beginning execution:
receiving input for use in instrumenting the application, wherein the input identifies a context in which the critical section will be encountered, specifies a condition usable in determining the context in which the critical section will be encountered, or indicates availability of an optimistic alternative code path for executing the critical section; and
instrumenting the application according to the received input; and
wherein said determining the context is dependent on execution of the application as instrumented.

7. The method of claim 1, wherein the method further comprises, prior to said beginning execution:
receiving input for use in instrumenting the application, wherein the input identifies a conflict region within the critical section, wherein the conflict region comprises program instructions that, when executed, are capable of causing a conflict with another thread that is executing a critical section of code in the application that is associated with the lock.

8. The method of claim 1, further comprising:
collecting, during said executing the application, information characterizing said executing, wherein the collected information comprises one or more of:
information characterizing the workload of the application;
information indicating a number of times that execution of each critical section of code in the application was attempted;
information indicating a number or percentage of times that a critical section of code in the application was successfully executed using each of the plurality of integrated mechanisms;
information indicating a number or percentage of times that execution of a critical section of code in the application was attempted using each of the plurality of integrated mechanisms; or
information indicating an amount of time spent in attempting to execute a critical section of code in the application using each of the plurality of integrated mechanisms.

9. The method of claim 8, wherein said collecting information is performed on a per-lock basis, a per-critical-section basis, a per-context basis, or per lock-context pair.

10. The method of claim 8, wherein at least one of said determining a context or said determining a policy is dependent on the collected information or is performed automatically in response to said collecting.

11. The method of claim 8,
wherein the method further comprises, prior to said beginning execution:
receiving input for use in instrumenting the application; instrumenting the application according to the received input; and
wherein the granularity at which the information is collected during said executing the application, as instrumented, is dependent on the received input.

12. The method of claim 8,
wherein the selected policy is an adaptive policy; and
wherein said selecting one of the plurality of integrated mechanisms, dependent on the determined policy, is further dependent on the collected information.

13. The method of claim 1, further comprising:
in response to failing to successfully execute the critical section using the selected one of the plurality of integrated mechanisms, attempting to execute the critical section using a different one of the plurality of integrated mechanisms.

14. The method of claim 1, further comprising:
in response to failing to successfully execute the critical section using the selected one of the plurality of integrated mechanisms:
acquiring the lock;
executing the critical section while holding the lock; and
releasing the lock.

15. A system, comprising:
one or more processor cores; and
a memory coupled to the one or more processor cores and storing program instructions that when executed on the one or more processor cores cause the one or more processor cores to perform:
beginning execution of a concurrent application;
while executing the application, a process of the application encountering a critical section of code in the application that is associated with a lock, wherein when the lock is held by a process, other processes are prevented from entering the critical section;
determining a context in which the critical section was encountered;
determining a policy that is applicable to the determined context, wherein the policy is usable in determining which of a plurality of integrated mechanisms for executing the critical section without acquiring the lock is to be employed in attempting to execute the critical section;
selecting one of the plurality of integrated mechanisms, dependent on the determined context or the determined policy; and
the process attempting to execute the critical section using the selected one of the plurality of integrated mechanisms.

16. The system of claim 15, wherein at least one of said determining a context, said determining a policy, or said selecting one of the plurality of integrated mechanisms is based, at least in part, on one or more of:
an environment or platform in which the application is executing;
availability or capability of hardware transactional memory support for executing the critical section using a hardware transaction;
concurrent use of hardware transactional memory by another process in executing a critical section of code in the application that is associated with the lock;
availability of an optimistic alternative code path for the critical section;
concurrent use of an optimistic alternative code path by another process in executing a critical section of code in the application that is associated with the lock; or potential concurrent use of an optimistic alternative code path by another process in executing a critical section of code in the application that is associated with the lock.

17. The system of claim 15,
wherein when executed on the one or more processor cores, the program instructions cause the one or more processor cores to perform collecting, during said executing the application, information characterizing said executing, wherein the collected information comprises one or more of:
information characterizing the workload of the application;
information indicating a number of times that execution of each critical section of code in the application was attempted;
information indicating a number or percentage of times that a critical section of code in the application was successfully executed using each of the plurality of integrated mechanisms;
information indicating a number or percentage of times that execution of a critical section of code in the application was attempted using each of the plurality of integrated mechanisms; or
information indicating an amount of time spent in attempting to execute a critical section of code in the application using each of the plurality of integrated mechanisms; and
wherein at least one of said determining a context, said determining a policy, or said selecting one of the plurality of integrated mechanisms is dependent on the collected information.

18. A non-transitory, computer-readable storage medium storing program instructions that when executed on one or more computers cause the one or more computers to perform:
beginning execution of a multithreaded application;
while executing the application, a thread of the application encountering a critical section of code in the application that is associated with a lock, wherein when the lock is held by a thread, other threads are prevented from entering the critical section;
determining a context in which the critical section was encountered;
determining a policy that is applicable to the determined context, wherein the policy is usable in determining which of a plurality of integrated mechanisms for executing the critical section without acquiring the lock is to be employed in attempting to execute the critical section;
selecting one of the plurality of integrated mechanisms, dependent on the determined context or the determined policy; and
the thread attempting to execute the critical section using the selected one of the plurality of integrated mechanisms.

19. The non-transitory, computer-readable storage medium of claim 18, wherein at least one of said determining a context, said determining a policy, or said selecting one of the plurality of integrated mechanisms is based, at least in part, on one or more of:
an environment or platform in which the application is executing;
availability or capability of hardware transactional memory support for executing the critical section using a hardware transaction;
concurrent use of hardware transactional memory by another thread in executing a critical section of code in the application that is associated with the lock;
availability of an optimistic alternative code path for the critical section;
concurrent use of an optimistic alternative code path by another thread in executing a critical section of code in the application that is associated with the lock; or
potential concurrent use of an optimistic alternative code path by another thread in executing a critical section of code in the application that is associated with the lock.

20. The non-transitory, computer-readable storage medium of claim 18,
wherein when executed on the one or more computers, the program instructions cause the one or more processor cores to perform collecting, during said executing the application, information characterizing said executing, wherein the collected information comprises one or more of:
information characterizing the workload of the application;
information indicating a number of times that execution of each critical section of code in the application was attempted;
information indicating a number or percentage of times that a critical section of code in the application was successfully executed using each of the plurality of integrated mechanisms;
information indicating a number or percentage of times that execution of a critical section of code in the application was attempted using each of the plurality of integrated mechanisms; or
information indicating an amount of time spent in attempting to execute a critical section of code in the application using each of the plurality of integrated mechanisms; and
wherein at least one of said determining a context, said determining a policy, or said selecting one of the plurality of integrated mechanisms is dependent on the collected information.

* * * * *